US008241687B2

(12) United States Patent
Bratton et al.

(10) Patent No.: US 8,241,687 B2
(45) **Date of Patent: *Aug. 14, 2012**

(54) PRESERVATION OF ORGANIC LIQUIDS

(75) Inventors: Graham J. Bratton, Kent (GB); Neil M. Alford, London (GB); Kenneth G. Mannering, Oxford (GB); Roger L. Brown, London (GB)

(73) Assignee: BBM Technology Ltd (GB)

( * ) Notice: Subject to any disclaimer, the term of this patent is extended or adjusted under 35 U.S.C. 154(b) by 491 days.

This patent is subject to a terminal disclaimer.

(21) Appl. No.: 12/309,900

(22) PCT Filed: Aug. 3, 2007

(86) PCT No.: PCT/GB2007/050468

§ 371 (c)(1), (2), (4) Date: Feb. 2, 2009

(87) PCT Pub. No.: WO2008/015481

PCT Pub. Date: Feb. 7, 2008

(65) Prior Publication Data

US 2009/0196968 A1 Aug. 6, 2009

(30) Foreign Application Priority Data

Aug. 3, 2006 (GB) .................................. 0615439.7

(51) Int. Cl.
*C11B 3/10* (2006.01)
*A47J 37/12* (2006.01)

(52) U.S. Cl. ...................... 426/417; 210/167.28; 99/408

(58) Field of Classification Search .................. 426/417, 426/362, 422, 423; 210/167.28; 99/408
See application file for complete search history.

(56) References Cited

U.S. PATENT DOCUMENTS

| | | | | |
|---|---|---|---|---|
| 1,851,203 | A * | 3/1932 | Moreton | 502/63 |
| 2,288,557 | A * | 6/1942 | Vollmer | 166/276 |
| 2,804,394 | A * | 8/1957 | Waide | 106/664 |
| 2,978,782 | A * | 4/1961 | Wagner | 264/330 |
| 3,862,054 | A * | 1/1975 | Sokolsky et al. | 502/84 |
| 4,112,129 | A * | 9/1978 | Duensing et al. | 426/417 |
| 4,502,954 | A * | 3/1985 | Druffel | 210/136 |
| 4,681,768 | A | 7/1987 | Mulflur et al. | |
| 4,880,652 | A * | 11/1989 | Regutti | 426/417 |
| 5,348,755 | A * | 9/1994 | Roy | 426/541 |
| 5,391,385 | A | 2/1995 | Seybold | |
| 5,870,945 | A | 2/1999 | Bivens | |
| 6,210,732 | B1 * | 4/2001 | Papanton | 426/417 |
| 6,229,032 | B1 | 5/2001 | Jacobs et al. | |
| 2007/0154603 | A1 * | 7/2007 | Withiam | 426/417 |

FOREIGN PATENT DOCUMENTS

| | | | |
|---|---|---|---|
| EP | 0226413 | A2 | 6/1987 |
| EP | 228595 | A2 * | 7/1987 |
| FR | 2188612 | | 1/1974 |
| GB | 2006729 | | 5/1979 |
| GB | 2006729 | A * | 5/1979 |
| JP | 2-83009 | A | 3/1990 |
| JP | 3-77615 | A | 4/1991 |
| JP | 3-193101 | A | 8/1991 |
| JP | 7-148073 | A | 6/1995 |
| JP | 9-019612 | A | 1/1997 |
| JP | 10-202022 | A | 8/1998 |
| JP | 2000-354713 | A | 12/2000 |
| JP | 2002-188094 | A | 7/2002 |
| WO | WO-91/11914 | A1 | 8/1991 |
| WO | WO 9111914 | A1 * | 8/1991 |

OTHER PUBLICATIONS

EP 0228595 English translation from espacenet website.*
White Portland Cement website (2004) available at www.tritonmaterials.com/wportland.html.*
"International Application Serial No. PCT/GB2007/050468, International Search Report mailed Jan. 11, 2008", 4 pgs.
"International Application Serial No. PCT/GB2007/050468, Written Opinion mailed Jan. 11, 2008", 9 pgs.
Grootveld, M., et al., "Warning: thermally-stressed polyunsaturates are damaging to health", *Food Chemistry*, 67, (1999),211-213.
Maskan, M., et al., "Effect of different adsorbents on purification of used sunflower seed oil utilized for frying", *Eur. Food Res. Technol.*, 217, (2003),215-218.

* cited by examiner

*Primary Examiner* — Viren Thakur
(74) *Attorney, Agent, or Firm* — Schwegman, Lundberg & Woessner, P.A.

(57) ABSTRACT

A method is provided for treating cooking oil during frying operations, which comprises in situ treatment of the oil with a source of calcium or magnesium combined with silicate such that the calcium or magnesium substantially does not leach into the oil. The filter treatment materials may be cement clinker, OPC, calcium silicate and combinations or mixtures thereof e.g. a combination of white OPC clinker and white OPC. The filter treatment materials may be in the form of a free briquette or block immersed in the oil. In other embodiments a decontaminating or filter cartridge is provided for fitting to a deep oil or fat cooker or a frying basket and comprises a foraminous housing containing filtering or decontaminant material. The cartridge may be used in association with a deep oil or fat fryer having a base formed with a depression defining a cool spot, the cartridge fitting in or on said cool spot.

11 Claims, 13 Drawing Sheets

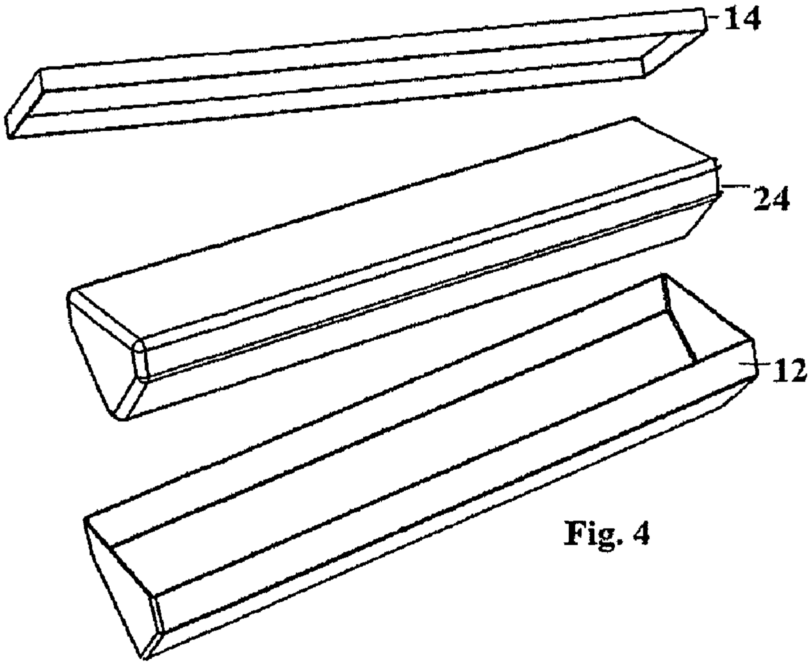
Fig. 4
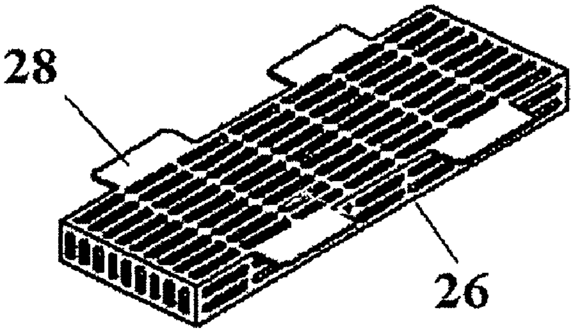
Fig. 5
Fig 6
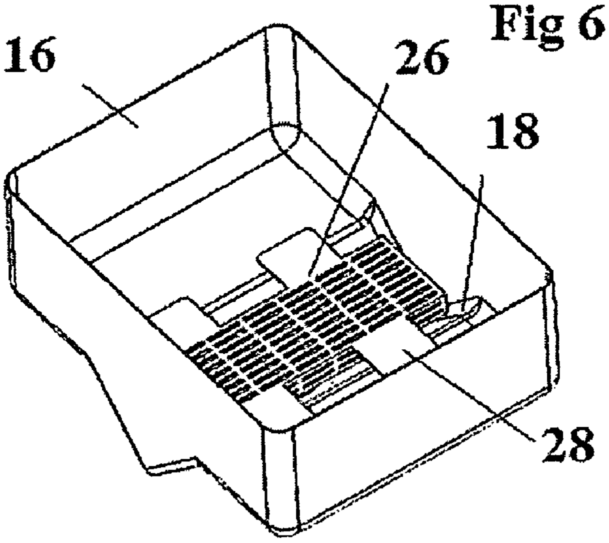

A-A

Modular Unit

PRESERVATION OF ORGANIC LIQUIDS

RELATED APPLICATIONS

This application is a nationalization under 35 U.S.C. 371 of PCT/GB2007/050468, filed Aug. 3, 2007 and published as WO 2008/015481 A2 on Feb. 7, 2008, which claimed priority under 35 U.S.C. 119 to United Kingdom Patent Application Serial No. 0615439.7, filed Aug. 3, 2006; which applications and publication are incorporated herein by reference and made a part hereof.

FIELD OF THE INVENTION

This invention relates to a method for in situ treatment of cooking oil or fat (which may be of vegetable or animal origin) during frying operations, and it also relates to free blocks, briquettes and cartridges for use in the above method.

BACKGROUND TO THE INVENTION

A number of specifications disclose the treatment of used cooking oil (includes vegetable oils and animal fats) from fat fryers in order to prolong the life of the oil.

Cooking oils are triglycerides whose structure is exemplified by the following compound having two radicals of oleic acid and one radical of palmitic acid attached to glycerol:

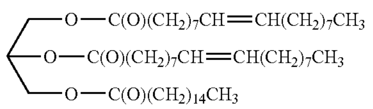

and additionally oils having as substituents multiply unsaturated fatty acid radicals e.g. linoleyl:

—$C(O)(CH_2)_7CH{=}CH(CH_2)CH{=}CH(CH_2)_4CH_3$

The following indicates the distribution of fatty acids in some common cooking oils, linoleyl being

—$C(O)(CH_2)_7CH{=}CH(CH_2)CH{=}CH(CH_2)CH{=}CH(CH_2)CH_3$

| Oil | Linolenic % | Linoleic % | Oleic % | Saturated % |
|---|---|---|---|---|
| Corn | 1.67 | 52.68 | 30.51 | 15.15 |
| Rapeseed | 6.76 | 23.56 | 58.39 | 11.29 |
| Sunflower | 0.95 | 60.29 | 26.57 | 12.19 |
| Olive, refined | 1.21 | 5.59 | 78.62 | 14.57 |
| Soyabean | 7.91 | 52.57 | 25.57 | 13.95 |
| GM Soyabean | 1.01 | 58.77 | 25.94 | 14.28 |

Deep drying of food in oils gives rise to degradation products that contaminate the oil and have undesirable effects.

Hydrolysis by the steam of cooking gives rise to free fatty acid which has surfactant properties and reduces the surface tension of the oil. As a result batter and breading absorb additional oil, giving rise to greasy fried food, and additionally the smoke point of the oil is reduced.

Oxidative degeneration of oils or fatty acids contained therein is free radical initiated and leads to various decomposition products including organic peroxides, alcohols, aldehydes, ketones, carboxylic acids, and high molecular weight materials. The oxidation process begins with the contact of air with hot oil or fatty acid therein or even with contact between air and cold oil in a and the ultimate creation of oxidized fatty acid (OFA). Continued heating transforms the OFA into secondary and tertiary by-products.

Contaminants in cooking oil are becoming of increasing concern from a health standpoint.

For example, Grootveld et al., *Food Chemistry,* 67 (1999) 211-213 warns that the formation of cytotoxic aldehydes in cooling oil during routine frying could be a health hazard.

Further undesirable contaminants in cooking oil are trans fats whose content in oil in a deep fryer may increase over time, especially if there is used an oil rich in Ω-3 fatty acids e.g. canola or rapeseed oil. Scientific evidence shows that consumption of saturated fat, trans fat, and dietary cholesterol raises low-density lipoprotein (LDL), or "bad cholesterol," levels, which increases the risk of coronary heart disease (CHD). NYC banned cooking oils with trans fats from July 2007 and any trans-fat additives from July 2008. However, tests show that fatty acids including and other toxic, mutagenous and carcinogenous chemicals, such as aldehydes, are actually generated when deep fat frying. Even in GM modified soyabean oils where the linolenic content has been reduced in favor of linoleic, trans fats will still form during the cooking process.

Various methods have been proposed for withdrawing cooking oil from a cooker where it is used, subjecting it to one or more purification treatments and returning the treated oil to the cooker. U.S. Pat. No. 3,947,602 (Vlewell et al., Bernard) discloses that the useful life of cooking oil is increased by treating the cooking oil with a food compatible acid and generally also with a suitable adsorbent such as an activated carbon. U.S. Pat. No. 4,112,129 (Duensing et al., Johns Manville) discloses filtering the oil through a composition comprising 47 to 59 parts by weight diatomite (70-80 wt % $SiO_2$), 28 to 36 parts by weight synthetic calcium silicate hydrate, and 12 to 24 parts by weight synthetic magnesium silicate hydrate. U.S. Pat. No. 4,330,564 (Bernhard) discloses a process for treating used fryer cooking oil comprising the steps of mixing said used cooking oil at a temperature of from about 150-200° C. with a composition comprising porous carrier e.g. rhyolite, water and food compatible acid e.g. citric acid and filtering the residue of said composition from said oil. US-A-2005/0223909 Kuratu) discloses filtering the oil through granite porphyry.

The effect of different absorbents on purification of used sunflower seed oil has been reviewed by Maskan et al., *Eur Food Res Technol* (2003) 217:215-218. The refining of used sunflower seed oil was investigated by various adsorbent treatments. Six adsorbents, CaO, MgO, $Mg_2CO_3$, magnesium silicate, activated charcoal and bentonite, as well as an available natural earth (i.e. pekmez earth, $CaCO_3$ containing special natural white soil) were studied. Pekmez earth, magnesium silicate (florisil) and bentonite exhibited the highest abilities in viscosity, free fatty acids (FFAs) reduction and colour recovery, respectively, among the adsorbents studied. Therefore, a mixture of 2% pekmez earth, 3% bentonite and 3% magnesium silicate was found to be the best combination. However the presence of adsorbents during the frying process was not disclosed.

Other methods have been proposed for treating cooking oil in situ in a cooker. U.S. Pat. No. 4,764,384 (Gyann, GyCor International) discloses that spent cooking oil may be rejuvenated by directly adding to the spent cooking oil in the fryer filtering media containing particles of material which become uniformly suspended throughout the liquid body of the spent cooking oil, the particles of filtering media material being effective to absorb contaminants and bleach the spent cooking oil to extend its useful life. The filtering media comprises synthetic amorphous silica provided with moisture, synthetic amorphous magnesium silicate, and diatomaceous earth. U.S. Pat. No. 5,354,570 (Friedman, Oil Process Systems) discloses a method of frying food in cooking fluid within which degradation products comprising surfactants are produced therein and food residue accumulates, wherein there is added a treatment compound e.g. a porous rhyolitic material in the form of a powder capable of selectively reducing the amount of said surfactants in said used cooking fluid, and wherein the treatment compound is permitted to remain within said fryer apparatus and to settle upon said food residue while continuing said food frying process. U.S. Pat. No. 5,391,385 (Seybold, PQ Corporation) discloses the hot treatment of oil with a mixture of 60-80% amorphous silica and 20-40% alumina. The mixture can be placed in a permeable container which is then placed in the oil, the container being permeable to the oil but not to the mixture so that the adsorbent is not released into the oil and filtration is not required. When the mixture is spent, the container of the mixture can be removed from the oil. JP-A-07-148073 (Yoshihide) discloses finely pulverized zeolite stones inserted into bag of filter material to form a package which may be put into a cooking vessel together with oil and a cooking material, and cooked together.

SUMMARY OF THE INVENTION

In one aspect there is provided a method for treating cooking oil during frying operations, which comprises in situ treatment of the oil with a solid filter treatment material derived from source of calcium or magnesium combined with a source of silicate such that the calcium or magnesium substantially does not leach into the oil.

The invention further comprises a method of retarding the in situ formation of fatty acid while the oil is hot or during deep fat frying or which comprises the in situ treatment of the oil with a solid filter treatment material derived from source of calcium or magnesium combined with a source of silicate such that the calcium or magnesium substantially does not leach into the oil.

By an essentially solid filter treatment material is meant a material having porosity so that oil can diffuse into the body of the material and contaminants can be deposited on and within the body of the material.

The invention further comprises a method of retarding the in situ formation of oxidation products e.g. aldehydes while the oil is hot or during deep fat frying which comprises the in situ treatment of the oil with a solid filter treatment material derived from source of calcium or magnesium combined with a source of silicate such that the calcium or magnesium substantially does not leach into the oil.

The invention yet further provides a method of retarding the in situ formation of trans fat while the oil is hot or during deep fat frying which comprises the in situ treatment of the oil with a solid filter treatment material derived from source of calcium or magnesium combined with a source of silicate such that the calcium or magnesium substantially does not leach into the oil.

In a further aspect, the invention provides a decontaminating or filter cartridge for fitting to a deep oil or fat fryer or a frying basket and comprising a foraminous housing containing filtering or decontaminant material.

In another aspect, the invention provides a deep oil or fat fryer having a base formed with a depression defining a cool spot and fitted in or on said cool spot with a decontaminating or filter cartridge comprising a foraminous housing containing filtering or decontaminant material.

In yet another aspect, the invention provides a frying basket removably provided with a cartridge comprising a foraminous housing containing filtering or decontaminant material.

In a yet further aspect, the invention provides a cooking vessel provided in its base with a circular form cartridge comprising a foraminous housing containing filtering or decontaminant material.

BRIEF DESCRIPTION OF THE DRAWINGS

How the invention may be put into effect will now be further described with reference to the accompanying drawings, in which:

FIG. 4 is an oblique view of the cartridge of FIG. 1 in an alternative form in which the filling is in a cassette;

FIG. 5 is a three-quarter view of a second embodiment of the filter cartridge, and FIG. 6 is a three-quarter view of a deep fat fryer fitted with the cartridge of FIG. 5;

DESCRIPTION OF PREFERRED EMBODIMENTS

Frying

Figure 1:
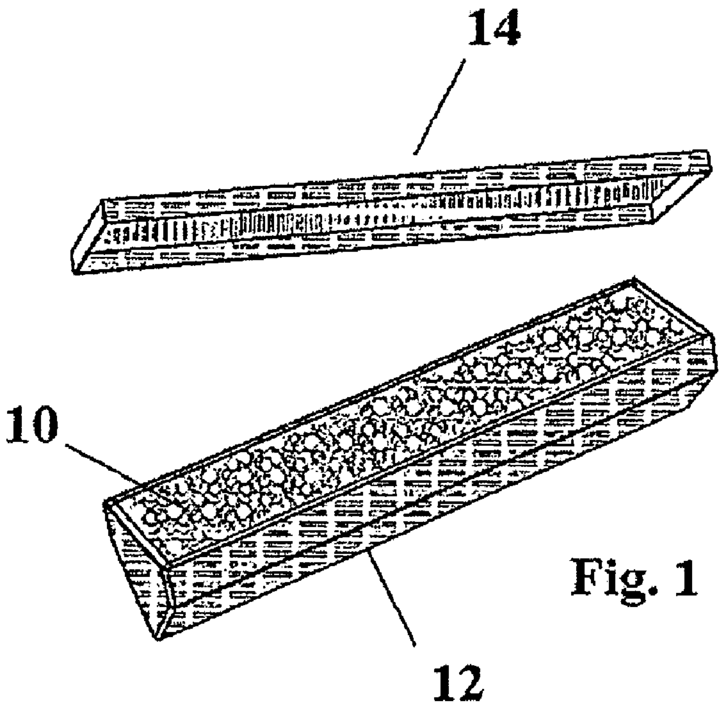
FIG. 1 is an oblique view of a first embodiment of the fitter cartridge with the lid removed.

The invention is applicable to the in situ treatment of oil in domestic deep fat fryers e.g. of oil capacity 2-3.5 liters and which may incorporate a wire mesh filter for the oil. It may also be used for in situ treatment of oil in counter-top single-basket or twin-basket deep fat fryers of oil capacity e.g. 7-16 liters, power rating 3-12 KW and usually with a single drain port, leaving filtration to the user. It may also be used with medium duty freestanding deep fat fryers e.g. of oil capacity 12-24 liters and rated at e.g. 9-18 kW, which may be provided with a cool zone having a lift-out strainer for removal of debris and for prolonging the life of the oil, and which are provided with an oil drain valve as a standard fitting. Standard commercial deep fat fryers may have e.g. two 15-litre baskets with lids, have about 25 kW power and may be provided with cool zones for making the changing of oil simple and quick. The invention may also be used for treatment of oil in range-type fryers as found in the UK in fish-and-chip shops.

Materials

In embodiments of the invention there may be used for decontamination of oil any material which is a reaction product of a source of calcium which is preferred or magnesium or a mixture thereof in an aqueous or organic medium with or without a catalyst (e.g. acid or base) with a source of silica to give a product which may be formed into shaped structures which are stable in hot oil and which do not leach harmful quantities of ionic species into the oil. Leaching of not more than 5 ppm calcium, preferably not more than 2 ppm is not detrimental, and up to 1 ppm of sodium but leaching of other ionic species e.g. iron, aluminum, zinc or copper should be kept to within negligible amounts. It is preferred, though not essential, that the source of calcium or magnesium and the source of silica should when mixed together act as a hydraulic material i.e. a material which sets and hardens after combining with water e.g. through formation of essentially water-insoluble hydrates.

One class of materials used in this invention is generally referred to as hydraulic cements. This means that the materials react with water to form a cementitious reaction product that acts as "glue" which binds the cement particles together.

The most common cement is Portland cement but there are several varieties of hydraulic cement including high alumina cement, pozzolanic cement and plaster of Paris (gypsum). In this explanation we restrict the description to Portland cement but the patent covers any hydraulic cement.

Portland cement and Portland cement clinker which may be used herein are made primarily from a calcareous material such as limestone or chalk and from alumina and silica both of which are found in clay or shale. Marl, a mixture of both calcareous and argillaceous materials is also used. The process of manufacture involves grinding these raw materials and mixing them in certain proportions to yield a composition shown in the table below (see AM Neville "*Properties of Concrete*", Pitman Publishing $2^{nd}$ Ed. 1977)

Approximate composition limits of Portland Cement

| Oxide | Content percent |
|---|---|
| CaO | 60-67 |
| $SiO_2$ | 17-25 |
| $Al_2O_3$ | 3-8 |
| $Fe_2O_3$ | 0.5-6.0 |
| MgO | 0.1-4.0 |
| Alkalis | 0.2-1.3 |
| $SO_3$ | 1-3 |

The raw materials are ground in a large rotary kiln at a temperature of around 1400° C. and the materials partially sinter together into roughly shaped balls (usually a few millimetres in size up to a few centimetres. This product is known as clinker and when it has cooled it is then ground to a fine powder with some gypsum added and the final product is known as Portland cement.

The hydraulic reaction of cement powder with water is complex. The component oxides shown in the table above combine to from four main compounds. These are

| | |
|---|---|
| Tricalcium silicate | $3CaO \bullet SiO_2$ |
| Dicalcium silicate | $2CaO \bullet SiO_2$ |
| Tricalcium aluminate | $3CaO \bullet Al_2O_3$ |
| Tetracalcium aluminoferrite | $4CaO \bullet Al_2O_3 \bullet Fe_2O_3$ |

These compounds react with water to form hydration products generally known as gel and calcium hydroxide. One relatively fast reaction which causes setting and strength development is the reaction of ticalcium silicate which is the major and characteristic mineral in Portland cement with water to give the so-called C—S—H phase of cement according to the equation:

$$2Ca_3SiO_5+6H_2O \rightarrow 3CaO.2SiO_2.3H_2O+3Ca(OH)_2.$$

A further reaction which gives rise to "late" strength in cement is the reaction of dicaleium silicate with water also to form the C—S—H phase of cement:

$$2Ca_2SiO_4+4H_2O \rightarrow 3CaO.2SiO_2.3H_2O+Ca(OH)_2.$$

Not all the cement powder reacts fully so that the hydration products are the "glue" that produce the cementitious reaction but that there is usually a core of product that remains unhydrated. The setting process causes the essentially fluid state of a cement slurry to change to a set and hardened product. The "curing" of cement is a term used to give the hydration reaction time to proceed and can be enhanced by modest temperature and humidity e.g. around 50° C. and 100% relative humidity.

Curing gives rise to porous structures which are permeable to cooking oil and promote reaction between impurities in the oil and the cement. If desired, the permeability the cement structures used in this invention may be increased e.g. by introducing air or other gas or a foaming agent into a mix of water with clinker or cement preferably so as to produce an aerated structure. Cut blocks of such structures have open-celled surfaces which facilitate uptake of liquids. Porous structures may also produced by adding to a water and clinker or cement mix a plastics or cellular plastics material which after the mixture has cured may be removed by heating or burning.

Particularly suitable filter treatment materials are white ordinary Portland cement (OPC), white cement clinker and combinations thereof. Clinker for forming such cements is kept as low as possible in transition metals e.g. chromium, manganese, iron, copper, vanadium, nickel and titanium and e.g. $Cr_2O_3$ is kept below 0.003%, $Mn_2O_3$ is kept below 0.03%, and $Fe_2O_3$ is kept below 0.35% in the clinker, the iron being reduced to Fe(II) to avoid discoloration of the cement. Limestone used in cement manufacture usually contains 0.3-1% $Fe_2O_3$, whereas levels below 0.1% are sought in limestones for white OPC manufacture. Apart form the white color which gives rise to products which are aesthetically pleasing and promote food industry and final customer confidence, the low transition metal content helps to minimize leaching of undesirable ionic species into the oil, especially iron and aluminium. Furthermore white OPC and white cement clinker contain relatively few iron and copper sites which can accelerate oxidation processes within the oil.

The cement clinker may be used in particle size from 1 μm to 10 mm i.e. in particles as supplied or as smaller particles or as solids made from finely comminuted and hydrated particles e.g. 5-100 μm more usually 10-50 μm. When using hydrated cement clinker and OPC, it has been found that a clinker size of about 14.5 μm works well. OPC is supplied as powder by the manufacturer.

Mixtures of white OPC clinker and white OPC are preferred, with the OPC preferably being 20-35 wt % of (OPC+clinker) e.g. about 25 wt % and the clinker preferably being 65-80 wt % of (OPC+clinker) e.g. about 75 wt %. In particular, a 25/75% mixture has been found to work well for the treatment of sunflower oil, but as noted above oils differ in their fatty acid contents, and the best proportions of OPC and clinker for treatment of other oils or blends of oils may differ from the value quoted above and may be found by trial and experiment.

Incidental ingredients may be added to OPC or OPC clinker, or to white OPC or white OPC clinker, including titania ($TiO_2$) typically in an amount of 1-2 wt % to promote whiteness and strength and/or silica typically in an amount of 1-2 wt % to promote strength. Where OPC or OPC clinker are used these may comprise 100 wt % of the treatment material (apart from incidental ingredients as aforesaid) or they may comprise >50 wt %, typically >75 wt %, more typically >90 wt % of the treatment material. The further ingredients that may be used in combination with OPC, OPC clinker or a mixture thereof may be selected from calcium silicate, magnesium silicate, feldspars (natural) (albite), zeolites (natural & synthetic) (Na & Ca forms), silica (amorphous & crystalline)/sand, wollastonite, calcium hydroxide, alumina (hydrated), aluminium silicates, clays (bentonite, perlite), pillared clays, activated clays/earths, talcs/kaolinite, other silicate minerals (amphiboles, granite porphyry, rhyolite, agalmatolite, porphyry, attapulgite) etc.

A further material that may be used according to the invention as treatment material with or without cement clinker and/or OPC is calcium silicate.

Further solid filter or treatment materials that may also be used with or without cement clinker and/or OPC include magnesium silicate, feldspars (natural) (albite), zeolites (natural & synthetic) (Na & Ca forms), silica (amorphous & crystalline)/sand, wollastonite, calcium hydroxide, alumina (hydrated), aluminium silicates, clays (bentonite, perlite), pillared clays, activated clays/earths, talcs/kaolinite, other silicate minerals (amphiboles, granite porphyry, rhyolite, agalmatolite, porphyry, attapulgite) etc. Binders/other additives that may be used include carbon black, cellulose fibre, diatomaceous earth, antioxidants (anion), flocculants (cation), food compatible organic acids (citric, maleic, phosphoric, acetic, tartaric or mixtures thereof). The filter medium may be formed from a selection of primary materials and one or more binders/other additives as pellets or balls and may be formed as (i) slurry, extrude and sinter, (ii) powder pressed, (iii) cement, hydration process or (iv) foamed cement, break-up and ball mill. The above materials may be mixed with a calcium source e.g. lime or calcium sulphate to impart hydraulic properties.

The treatment or filter medium may be formed from a selection of primary materials and one or more binders/other additives as pellets, balls, briquettes or stand-atone forms and may be formed any of (i) Slurry, extrude and sinter
(ii) Powder pressed with and without sintering
(iii) Cement hydration process with and without sintering
(iv) Ram & Pressure casting
(v) Foamed cement break-up and ball mill and re-hydrate (lime may be required)
(vi) Reticulated foam
(vii) Increase strength by addition of silica (grain size & shape) and/or $TiO_2$ for colour (white) and strength.

Particular materials that may be incorporated into the filter medium or cartridge include:

Activated carbon—decolourises the cooking oil and adsorbs odour-causing components.

A silicate—removes fatty acids that are formed as the oil begins to chemically break down.

Cellulose fibre—provides a support matrix to which other components can bind.

Resin binder—binds the other components together prior to sintering.

Diatomaceous earth—functions to remove particulate matter and to provide increased holding capacity for particulate matter.

Stand-Alone Treatment or Filter Blocks

The use of cementitious materials including white cement clinker and white OPC lends itself to the formation of shaped articles which may be stand-alone forms such as blocks and briquettes or other complex shapes. Such articles are simple and inexpensive to manufacture by molding and are usually strong enough and sufficiently heat resistant to withstand immersion in hot cooking oil or fat without cracking, although addition to the oil while the oil is cool followed by heating will be the normal procedure. Stand-alone treatment blocks/briquettes may contain various shaped apertures formed by casting, extrusion, foam reticulation or other means to allow oil to pass inside the filter or treatment block and to increase the active surface area in contact with the cooking oil and to permit free flow of oil through the filter or treatment medium.

Figure 21:
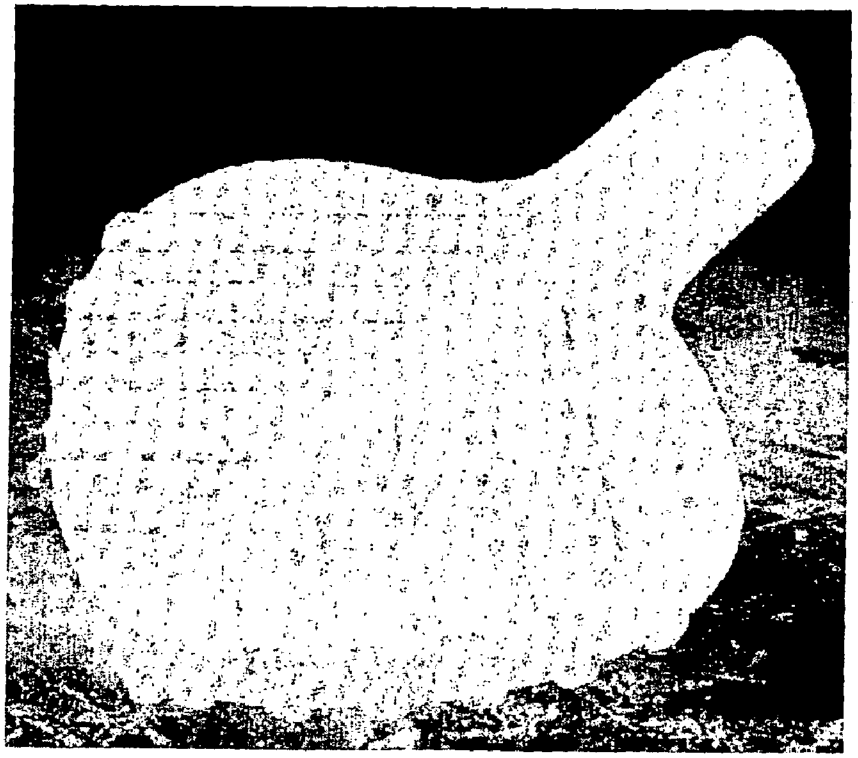
FIGS. 21-26 are perspective views showing embodiments of treatment blocks.
Figure 22:
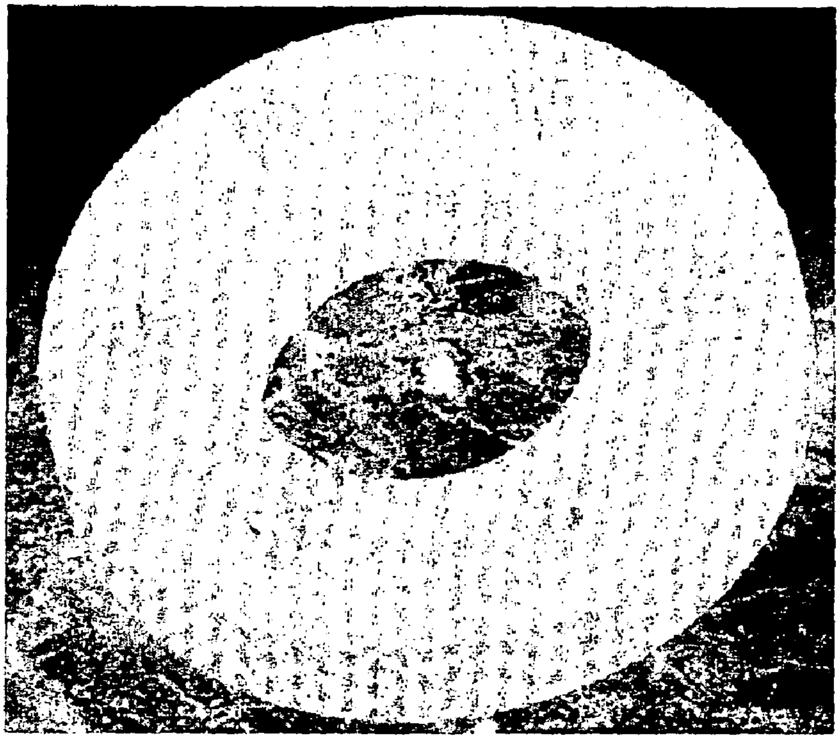
Figure 23:
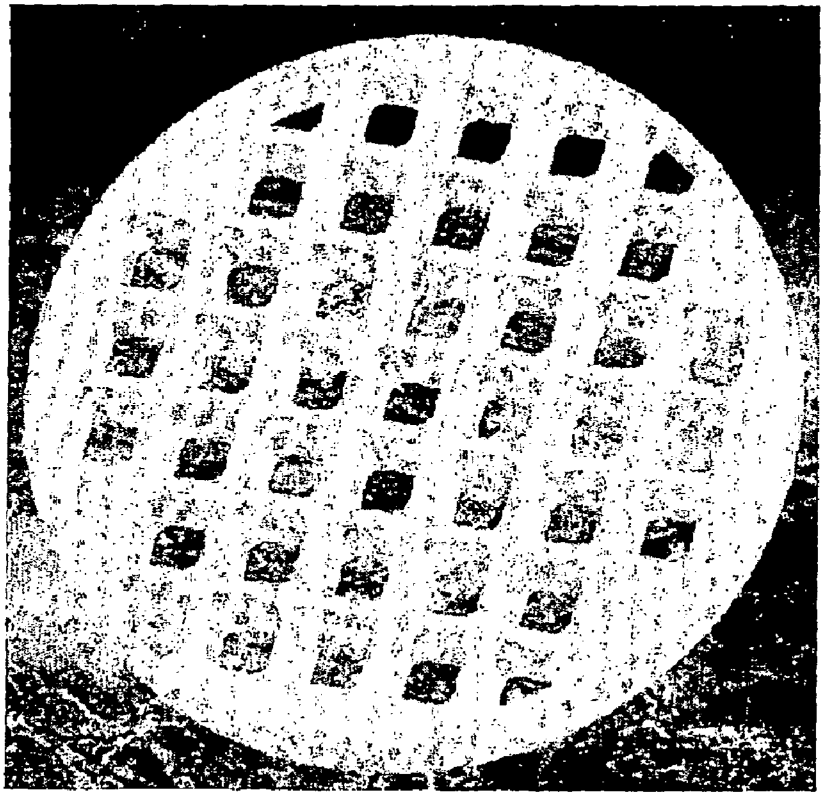

FIG. 21 shows a styled filter for smaller home fryers showing a leaf shape that allows the user to hold the stem whilst inserting to gently lower into the oil to prevent splashing. Projecting ribs stand the filter off from the flat base of the fryer to permit oil circulation, while perforations allow flow of oil through the filter for increased active surface area. FIG. 22 shows a ring filter or treatment unit that may be stacked on a central spindle to achieve greater filter size or just multiply dropped into smaller oil reservoirs in the same plane as the base. Star shaped apertures increase the active surface area presented to the oil. FIG. 23 shows a filter disc having apertures over substantially its whole face, thereby presenting a large active surface area for a given size and a low resistance to oil flow.

Figure 24:
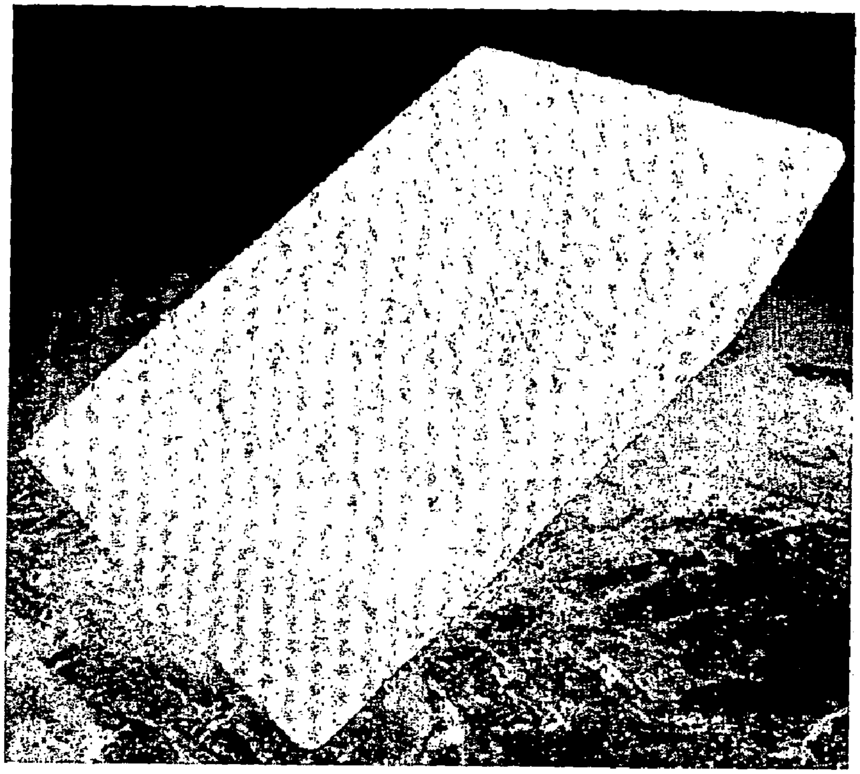

Orientation of the majority of macro apertures in the outside faces of filter or treatment blocks or cartridges for oil ingress and egress may be in the vertical plane to permit free oil flow through the filter or treatment block or cartridge (FIG. 24) while horizontal or other often non-vertical passages my be formed to provide a convoluted oil flow path to extend the path length and residence time of oil within the filter to permit optimal extraction and adsorption of desired contaminants. Indirect alignment or staggering of major external apertures in any particular plane may be employed to further promote path length and residence time.

Figure 25:
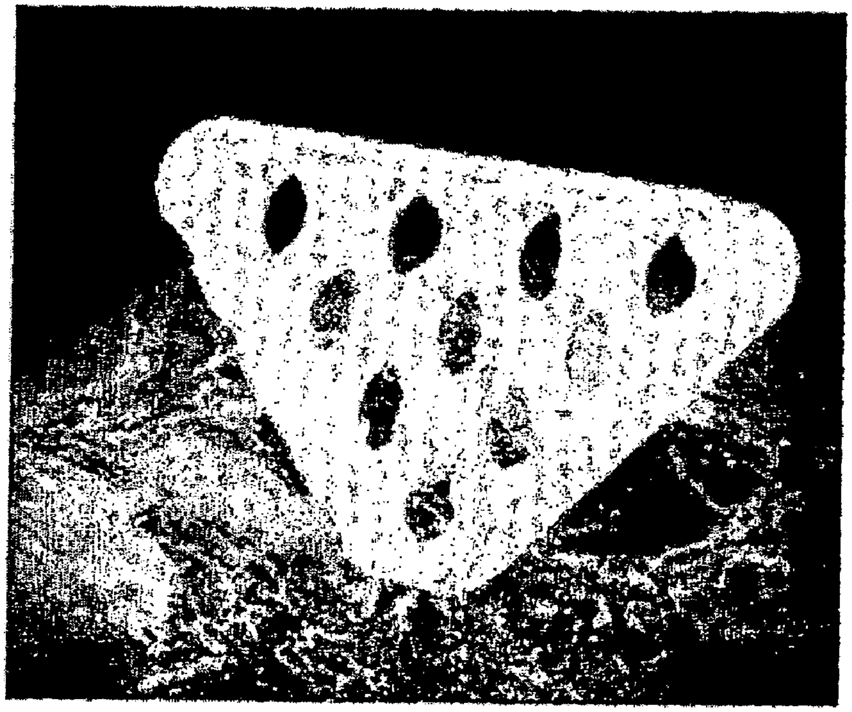
Figure 26:

Filter blocks may also be formed from arrangements of a regularly repeated modular base form (FIG. 25) to allow interlocking or stacking of the blocks (FIG. 26) to achieve an efficacious surface area and volume of filter material required to treat the volume of oil in the cooking oil reservoir for the purposes of achieving extended filter life with respect to the duty cycle and amount of foodstuff cooked in a given time period without requiring large manufacturing casting tools or production of multiple product sizes to accommodate such process needs and varying-size oil reservoirs. In these cases, more modular parts may be simply interlocked to achieve any necessary greater filter sizes based around multiple instances of a single small filter component.

Cartridges Having Internal Treatment or Filter Media

Figure 2:
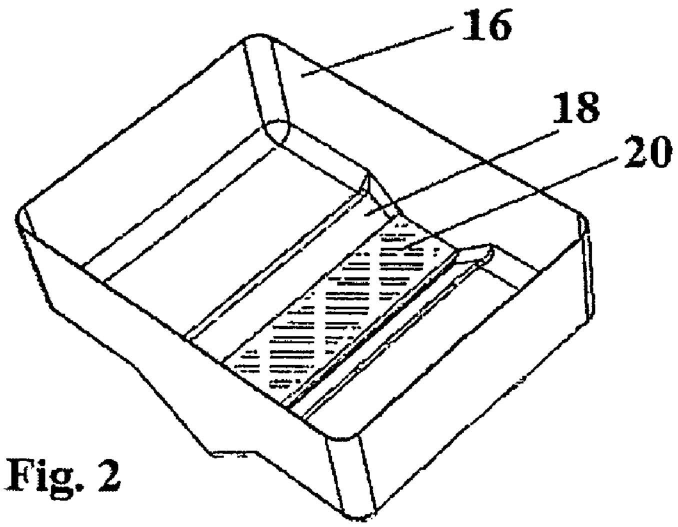
FIG. 2 is an oblique view of a deep fat fryer fitted with the cartridge of FIG. 1
Figure 3:
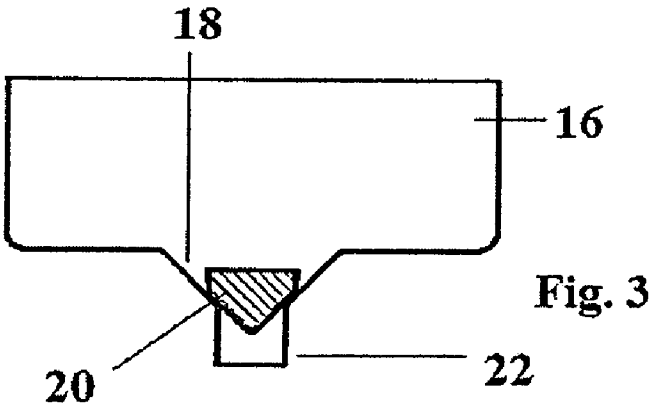
FIG. 3 is a sectional view of the deep fat fryer and cartridge.
Figure 7:
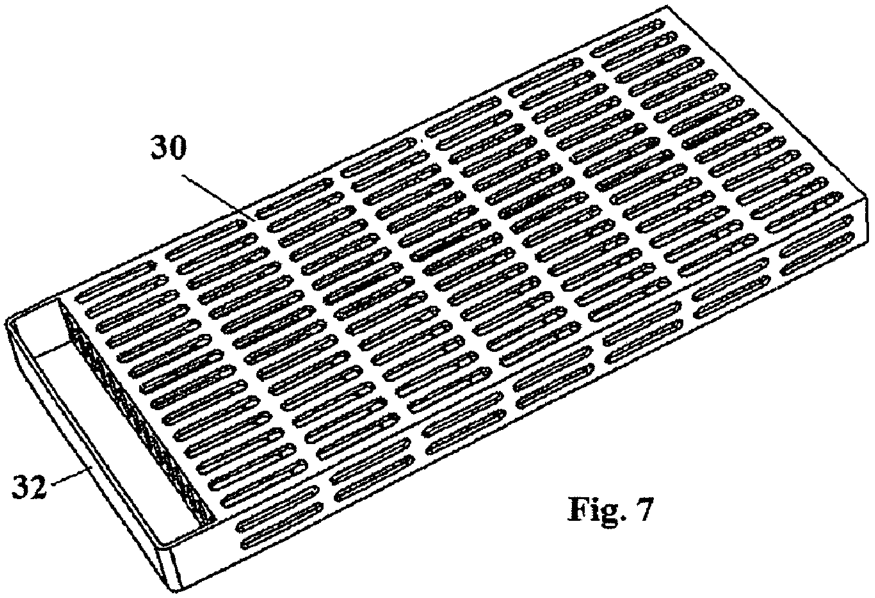
FIG. 7 is a three-quarter view of a third embodiment of the filter cartridge, FIGS. **8*a*-8*c* are respectively a plan, transverse section and longitudinal section of a frying basket fitted with the filter cartridge of FIG. 7, and FIGS. 8*d* and 8*e* are respectively a three-quarter view of the frying basket with the cartridge in place and of the frying basket with the cartridge partly removed.
Figure 8A:
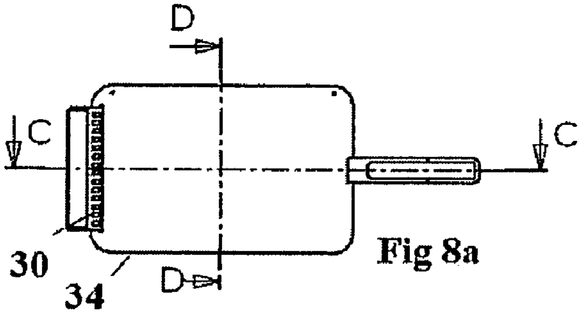
Figure 8B:
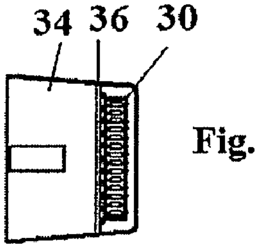
Figure 8C:
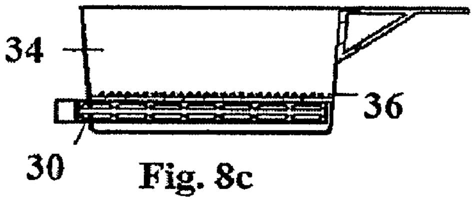
Figure 8D:
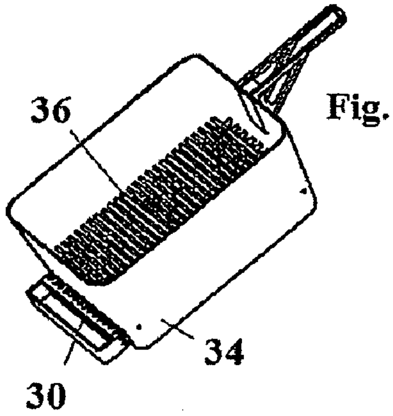
Figure 8E:
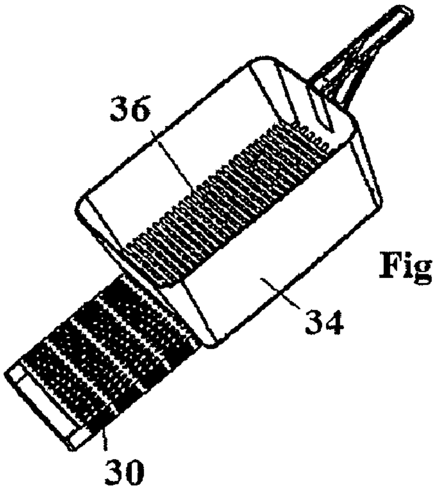

In some embodiments there is provided a treatment block or treatment cartridge 20 (FIG. 2) which is placed in a deep-fat cooking oil tank (16) which is employed during the cooking process where the oil is normally heated to the region of 160° C. for the purpose of cooking a variety of different foods.

In commercial applications with tanks with a capacity in excess of 15 L it is normal to have a central depression (18) in the lower surface of the tank to define the cool spot. The filter is placed in such location that thermal convection caused by the heater elements or gas flames, which heat the oil in certain positions and provides a lower temperature area or cool-spot, passes through the filter medium to remove burnt food residue, fatty acids created during the deep fat frying process, and other unwanted by-products or contaminants that otherwise affect the flavour, colour, appearance and specifically may be detrimental to the health of the consumer.

The function of embodiments of a cool zone in a deep fat fryer is explained e.g. in U.S. Pat. No. 5,335,776 (Driskill, Daylight Corporation). Heat provided by heaters is concentrated in the oil at an upper portion of the sidewalls with substantially no heat being transferred to the cooking oil through the lower portion of the sidewalls. In this manner the oil within the vessel is cooler in a lower V-shaped trough portion, thereby providing an upper frying zone and a lower cool zone in the cooking oil within the vessel. This arrangement of providing a V-shaped, or trough shaped, bottom for the vessel along with spaced apart heaters that do not heat the lowermost trough portion of the vessel bottom causes convection currents to be formed in the cooking oil in the fryer. These convection currents flow generally in circular paths within the cooking oil. The convection currents tend to move small particles of food that are dislodged or disassociated from the food being prepared into the lower cooking oil cool zone. The temperature of the oil in the cool zone is such that further cooking of the particles is substantially terminated so that the particles are less likely to become charred and blackened. Further, the movement of the food particles into the lower oil cool zone prevents a substantial portion of the particles from adhering to food being prepared. A similar arrangement may be provided for pressure fryers to which the invention is also applicable, see U.S. Pat. No. 6,505,546 (Koether et al., Technology Licensing Corporation).

In fryers of this kind the present treatment composition may be situated either in the upper hot zone or in the lower cold zone.

Placement of the treatment block or filter cartridge 20 within the cool spot provides a location away from gas heating points usually located either side of the cool spot depression or interference with any electrical heating elements normally located on the floor of the oil tank either side of the cool spot thus preventing overheating of the filter block or housing and media, allowing free flow of oil around the heaters and allowing free flow of oil through thermal convection.

FIG. 1 shows a vee-section filter or treatment cartridge housing which is shaped to fit in the mouth of a typical commercial deep fat fryer cool spot, normally used to funnel the oil to a drain cock or spigot when draining out of the oil tank for disposal or other external filtration processes. The housing comprises a base housing 12 fabricated from a perforated metal such a stainless steel or other material capable of withstanding the operating temperature up to the region of 200° C. without degradation and a similar material removable perforated cover 14 which perforations allow free movement of the oil through the casing to the inner treatment media via normal thermal convection. The housing contains a bed 10 of filter treatment material. A minimum aperture to solid material ratio for the perforated casing is 1:4 and preferably 1:2 or better to allow for free oil circulation.

A second embodiment of the treatment cartridge shown in FIGS. 5 and 6 consists of a rectangular housing 26 of similar mesh or perforated material as the V-section filter but planar in form and provided with tabs 28 or other supports to allow suspension over the commercial fryer cool spot 18. This treatment cartridge has a smaller cross section and volume than the vee section filter and provides for a freer circulation of oil through the treatment media which may be in loose form or cassette form.

A third embodiment of the treatment cartridge (FIGS. 7 and 8*a*-8*e*) employs a similar rectangular housing 30 provided with a handle 32 but without the support tabs and intended for location in the lower section of a modified standard type mesh frying basket 34. The filter again consists of a perforated or mesh holder or housing 30 of stated materials and nature of perforations for loose or cassette form filter or treatment media which is normally fitted into the base of the frying basket 34 to provide for good oil flow through the media via thermal convection. In one form of this embodiment the filter or treatment housing is slideably and removably located in a pocket partitioned from the food by a mesh or perforated separator 36 to prevent food directly touching the filter, for easy removal of food after cooking and easy cleaning or replacement of the filter media. In the illustrated form, the handle 32 is provided at the outer end of filter housing to provide for easy insertion and removal. Location of the filter or treatment cartridge within the basket allows use in any deep fat fryer with or without a cool spot depression, such as smaller commercial or home fryers with essentially rectangular oil tanks, often with oil capacities less than 15 L. Furthermore, location of the filter in the frying basket prevents it sitting directly on top of any electric heater elements protruding into the oil tank and thus overheating the filter housing or media and interfering with free circulation of oil through thermal convection. In smaller home and commercial deep fat fryers where there is no cool spot and little space for alternative location and essentially no protruding heating elements within the oil tank, the rectangular filter may be placed loose in the bottom of the tank under the basket.

Figure 9A:
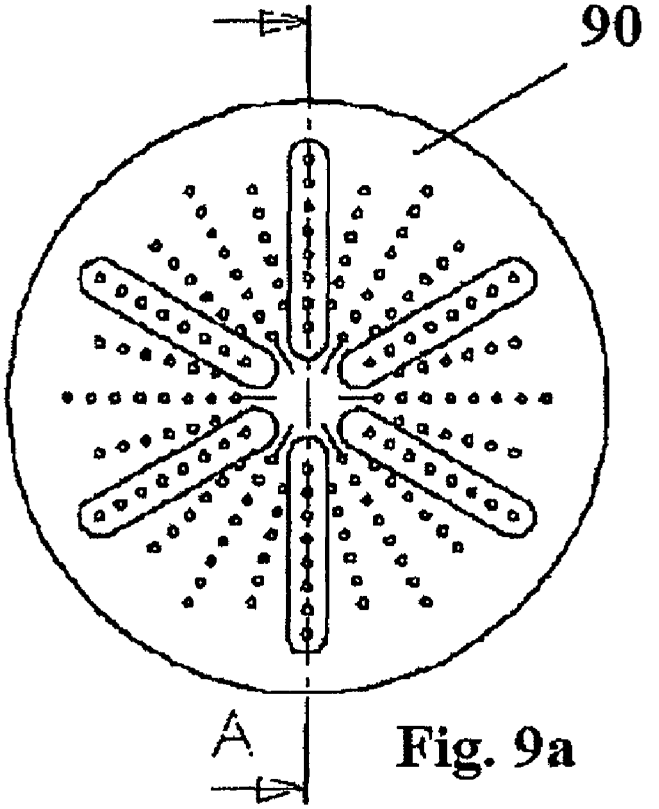
FIGS. 9*a* and 9*b* are plan and side views of a fourth embodiment of the filter cartridge and FIG. 9*c* is a view of a cooking pan provided with the cartridge of FIG. 9*a***.
Figure 9B:
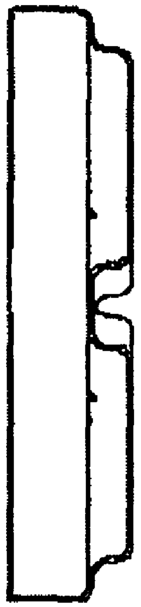
Figure 9C:
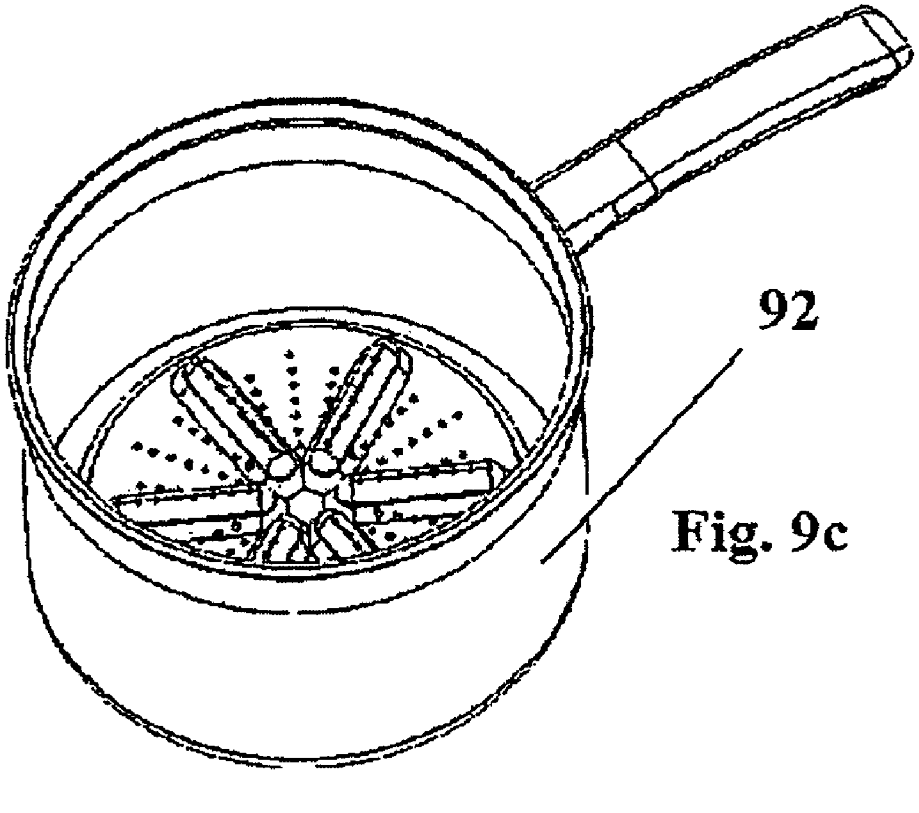
Figure 10:
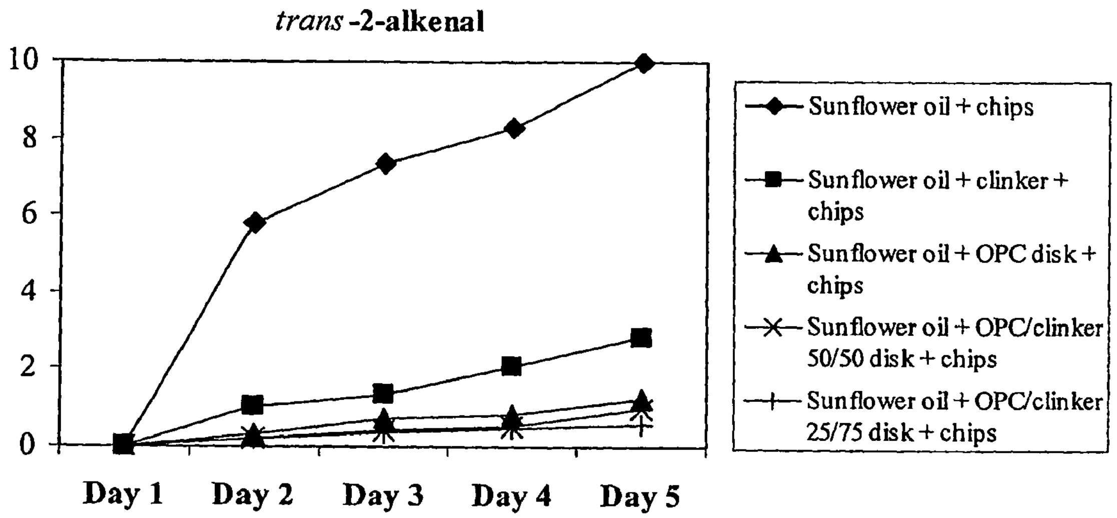
FIGS. 10-15 are graphs respectively showing concentrations of trans-2-alkenals, trans,trans-alka-2,4-dienals, 4,5-epoxy-trans-2-alkenals, 4-hydroxy-trans-2-alkenals, cis,trans-alka-2,4-dienals and n-alkanals generated from the heating of sunflower oil as a function of time, normalized relative to the concentration of trans-2-alkenals in control heated sunflower oil.
Figure 11:
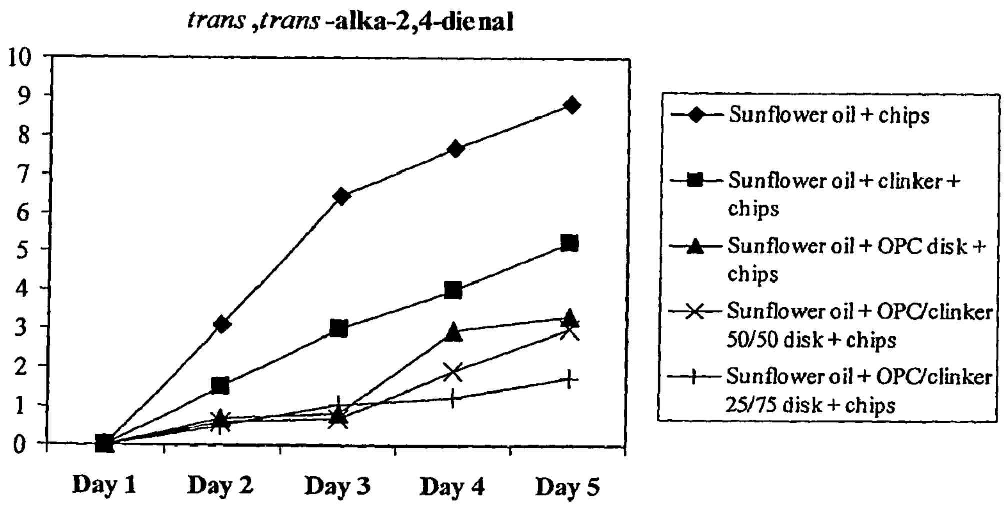
Figure 12:
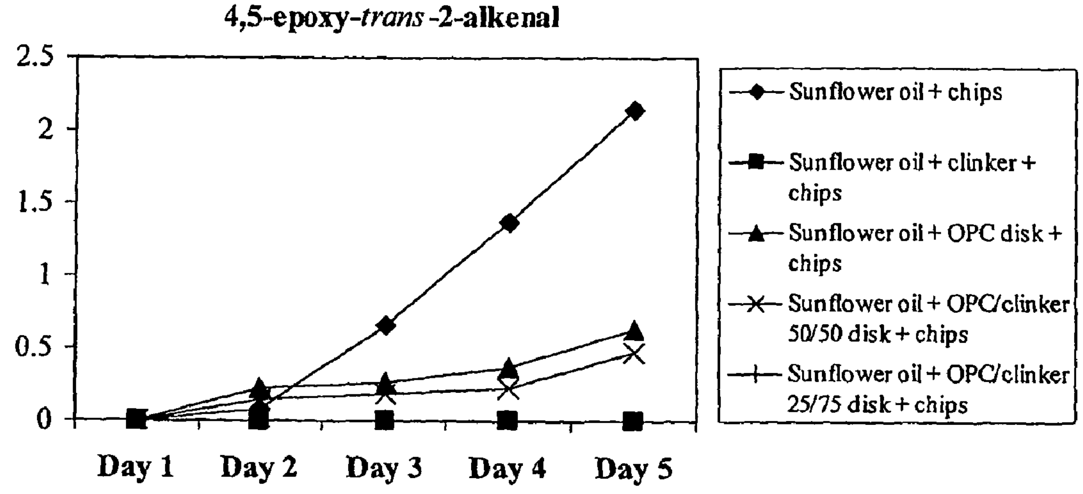
Figure 13:
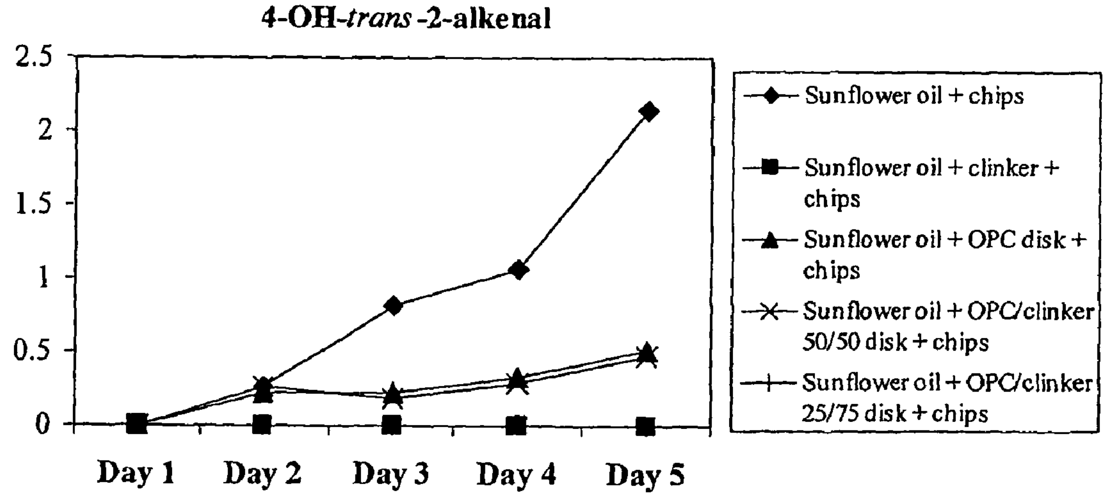
Figure 14:
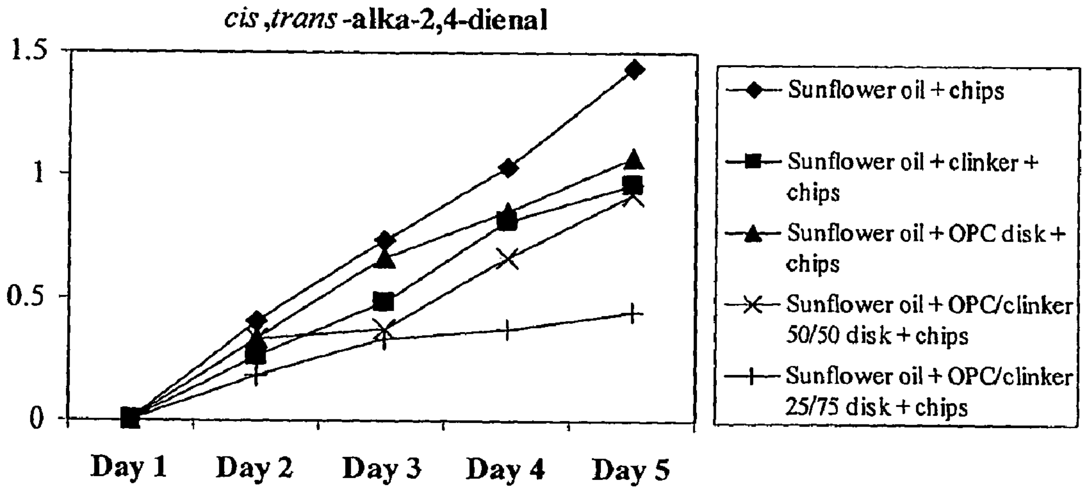
Figure 15:
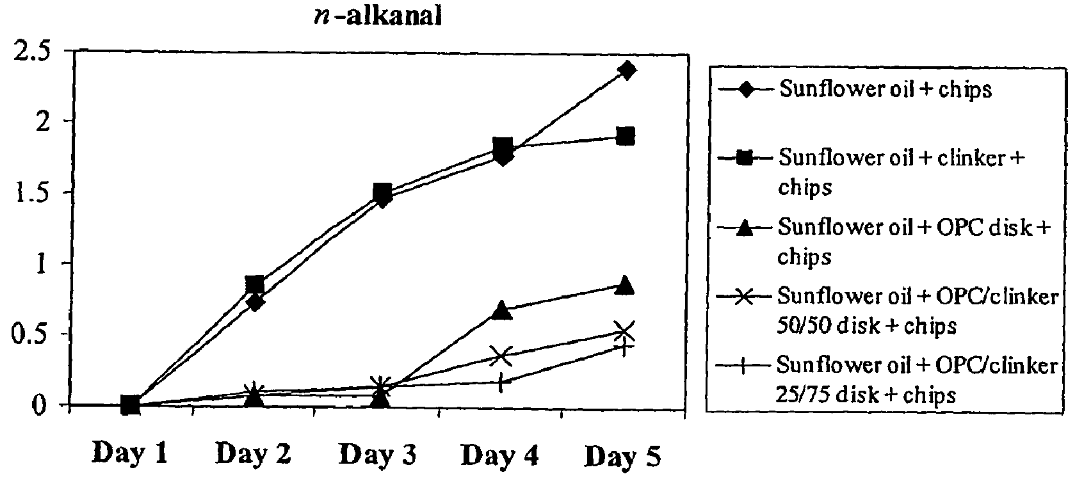

A fourth embodiment of the filter or treatment housing (FIGS. 9*a*-9*c*) is envisaged which is circular in form for placement in the bottom of pan type deep fat fryers or other cylindrical tank forms as are employed by some commercial fast food outlets. The circular form housing (90) is again constructed from material capable of withstanding temperature in the region of 200° C. such as stainless steel and is of perforated or mesh formation with similar attributes to that described in the first embodiment form. The diameter and depth may be varied to be fitted into a variety of frying pans 92, deep fat fryers and dedicated cylindrical section commercial or home deep fat fryers with the filter media capacity varied to suit the specific application.

Figure 19:
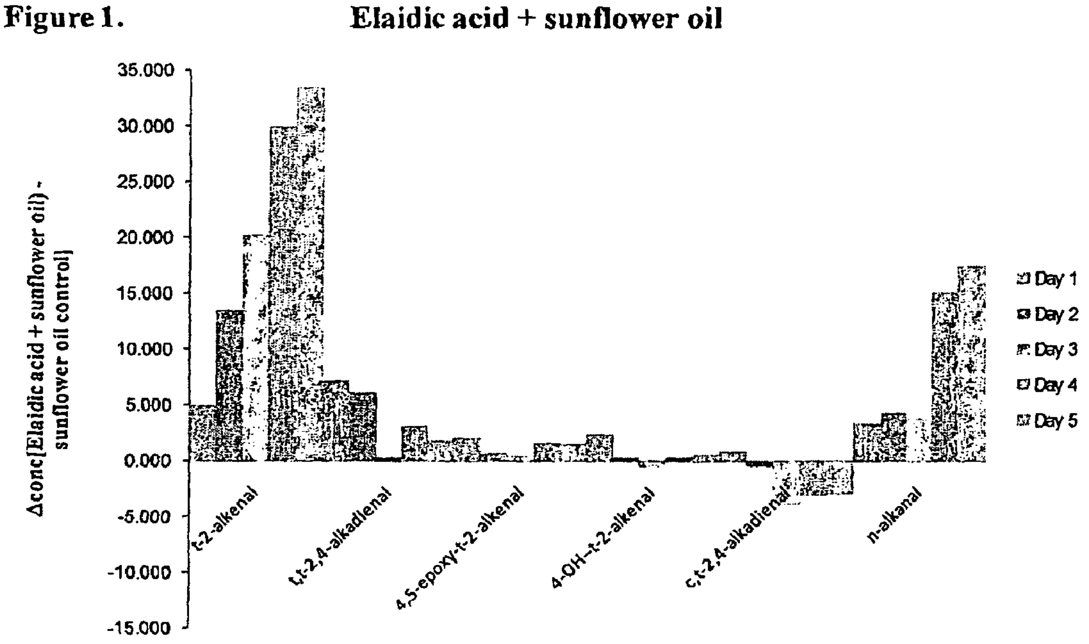
FIGS. 19-20 are bar charts showing aldehydic product contents in sunflower oil after cooking without and with a 25/75 ratio OPC/clinker treatment disk.
Figure 20:
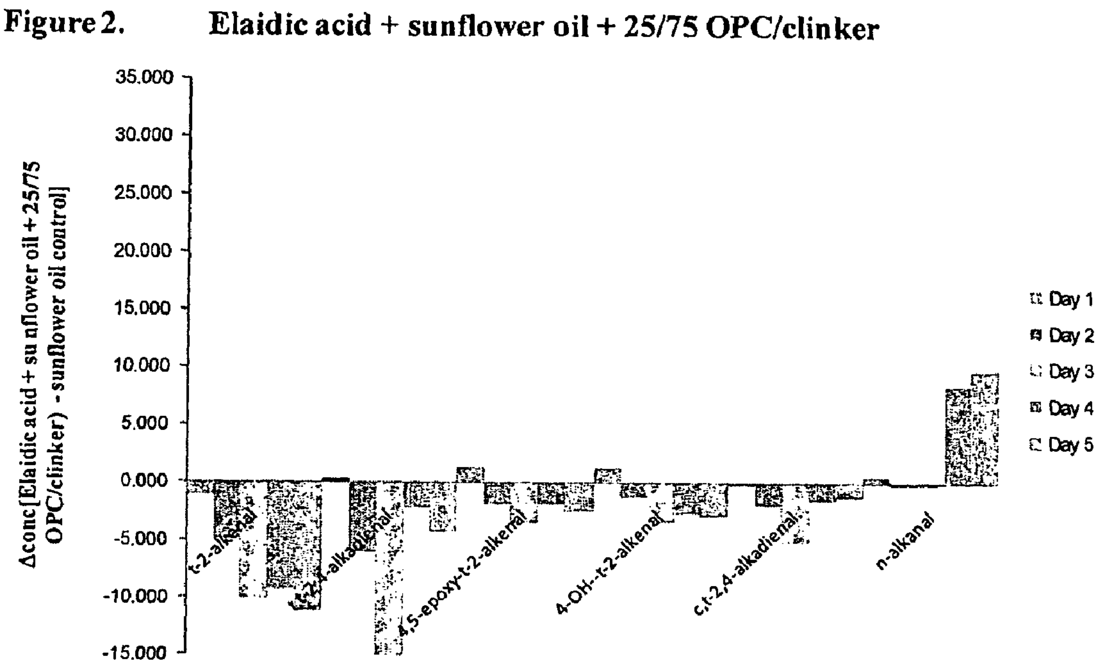

In the above embodiments, the filter or treatment media (10) may be loose material, in granular or shaped bead of nearly spherical, star section or cylindrical form or any other shape designed to provide large surface area and good oil flow through the loosely packed media. It may be provided in a pre-packed replaceable cassette 24 (FIG. 4) which allows an easy clean and quick refilling action. Alternatively and in preferred embodiments, the treatment medium may be free-standing, in the form e.g. of a disc (FIG. 19) or block (FIG. 20).

How the invention may be put into effect will now be further described with reference to the following examples.

EXAMPLE 1

Cement Clinker and OPC

Aalborg White Cement Clinker and Aalborg White OPC are materials available from Aalborg Portland Group of Denmark Aalborg white OPC is produced from extremely pure limestone and finely-ground sand. It has a low alkali (Na2O) content of 0.2-0.3 wt %, a low tricalcium aluminate (C3A) content of 4-5 wtT and a chromate content of not more than 2 mg/kg.

The white cement clinker as supplied had a particle diameter of 8 mm, an analysis of $SiO_2$ 25.0%, $Al_2O_3$ 2.0%, $Fe_2O_3$ 0.3% and CaO 69.0%, and a Bogue composition of C3S 65.0%, C2S 21.0%, C3A 5.0% and C4AF 1.0% wherein C3S represents tricalcium silicate $Ca_3SiO_5$, C2S represents dicalcium silicate $Ca_2SiO_4$, C3A represents tricalcium aluminate $Ca_6Al_2O_6$ and C4AF represents tetracalcium alumino-ferrite $Ca_4Al_2Fe_2O_{10}$. The white cement clinker had a surface area of 0.43 $m^2/g$, porosity of 37% and density of 1.1. It was effective to remove free fatty acids, aldehydes and other contaminants from oil, and gave rise to the following benefits:

- Increase of the useful lifetime of cooking oil by 40 to 70% to or even up to 100% or more.
- Reduced build up of fatty acids, oxidation products (carcinogens such as aldehydes, peroxides and free radicals etc)—health.
- Improved taste and appearance of fried food.
- Reduced acid value and viscosity (caused by oxidation products).
- Reduced quantity of used cooking oil requiring disposal.

The OPC had an analysis of $SiO_3$ 2.03%, $SiO_2$ 24.4%, $Al_2O_3$ 1.97%, $Fe_2O_3$ 0.34%, CaO 68.6%, MgO 0.58%, Cl 0.01%, $TiO_2$ 0.09%, $P_2O_5$ 0.30%, $K_2O$ 0.16% and $Na_2O$ 0.19%, a Bogue composition of C3S 66.04%, C2S 20.1%, C3A 4.64%, C4AF 1.04% and $CaSO_4$ 3.45%

Both materials were milled as appropriate to give a desired particle size e.g. 14.5 μm.

Preparation of Disks

Hydrated OPC and clinker samples were prepared as follows. Discs were cast in containers of 50 mm diameter to give 50 mm diameter discs ~10 mm in thickness. In order to form the discs, there were used 30 g OPC and 12 g water for cement only, and e.g. 15 g OPC plus 15 g clinker with 12 g water for the 50/50 OPC & clinker formulation. Water was added to the cement/clinker and the mixture was stirred with a spatula to give a creamy porridge-like consistency, after which the mixture was poured into a paper cup and the cup was put into a plastics container over water so that the relative humidity in the container was ~100%. The container was maintained at 40-50° C. for 5 days.

Porosity was estimated as follows. Samples of filter disk materials were soaked in water overnight, patted dry, weighed and then placed in a furnace (ca. 220° C.) for a further overnight period and then further weighed. The % absorption of water was deduced by using the formula %=((((weight boat+wet disk)−weight boat)−((weight boat+dry disk)−weight boat))/((weight boat+dry disk)−weight boat)))×100. Typically five disk samples of each type were analyzed.

Strength was tested using an Instron 1122 universal testing machine and a standard 3-point test jig with adjustable span settings, again supplied by Instron. Typically a span of 40-50 mm was used depending on the sample. Load was applied to the sample using a crosshead speed of 5 mm/min. A peak load was measured using a tension-compression load cell (model A217-12) capable of reading 100, 200, 500, 1000, 2000 & 5000N full-scale ranges. The modulus of rupture of the sample was then calculated using $f_{max}$=6 W L/4 $bd^2$ where b=the width and d=thickness of the sample. W=applied load and L is the span.

The hydrated samples had the following properties:

TABLE 1-1

| Sample No. | OPC % | Clinker % | Wt % water adsorption | Porosity (%) | Strength (MPa) |
|---|---|---|---|---|---|
| 1 | 100 | | 19.22 | ~38.44 | 4.03 |
| 2 | | 100 | 26.12 | ~52.14 | |
| 3 | 50 | 50 | 23.31 | ~46.62 | 3.76 |
| 4 | 25 | 75 | 25.31 | ~50.62 | 14.7 |
| 5 | 75 | 25 | 22.57 | ~45.14 | 3.0 |
| 6 | 50 | 50 | * | * | * |
| 7 | 50 | 50 | 20.82 | ~41.64 | 3.3 |
| 8 | 50 | 50 | 19.28 | ~38.56 | 5.8 |

Evaluation of the Discs

The above filter disks, e.g. of formulation e.g. 25% hydrated OPC/75% white clinker (typical weight 35 g), were placed in 400 ml of sunflower oil, the oil then being allowed to attain an optimum cooking temperature of 180° C. through the use of an electronic hotplate. 90 g of potato chips was then added to the hot oil and cooked until "brown". They were then removed and replaced with fresh chips of the same weight, this being repeated so as to give a total number of fries per day of 8. A total of 5 days frying was performed. After each day's frying, a sample of oil was retained and viscosity, pH, color and $^1$H NMR spectroscopic measurements were performed. Results of the experiments can be summarized as follows:

Leaching Performance

This was evaluated as follows. 10.0 ml of a sunflower oil sample after five days frying with potato chips was ashed in a furnace operating at 500° C. for 5 hours, microwave digested in 10.0 ml of concentrated nitric acid, subsequently diluted to a final volume of 25.0 ml with deionised water and then analysed (% Ca, Fe, Na, Al, Zn, Cu) by ICP-AES (Thermo Jarrell Ash Trace Scan). The elemental analysis results are in Table 1-2.

TABLE 1-2

| Material | Ca | Fe | Na | Al | Zn | Cu |
|---|---|---|---|---|---|---|
| Clinker | 0.575 | n.d. | 0.010 | n.d. | n.d. | 0.021 |
| OPC disk | 0.832 | n.d. | 0.539 | n.d. | n.d. | 0.002 |
| OPC/clinker disk 50:50 | 1.022 | n.d. | 0.557 | n.d. | 0.125 | 0.013 |

TABLE 1-2-continued

| Material | Ca | Fe | Na | Al | Zn | Cu |
|---|---|---|---|---|---|---|
| OPC/clinker disk 25/75 | 0.306 | n.d. | 0.306 | n.d. | n.d. | n.d. |
| OPC/clinker disk 75/25 | 3.023 | n.d. | 0.243 | n.d. | 0.006 | 0.045 |

[a] n.d.—none detectable. All values in ppm.

Calcium and sodium are physiologically acceptable cations, and leaching into oil at the level of <5 ppm preferably <2 ppm is desirably <1 ppm. Leaching of other cations e.g. Fe, Al, Zn and Cu should be minimized. None of the above samples exhibited detectable leaching of either Fe or Al. It will be noted that the OPC 25 wt %/clinker 75 wt % disc exhibited low leaching of calcium and other materials.

pH, Viscosity & Colour

Measurement of pH provides an indication of the level of acidic species present in the oil. Measurement of viscosity and colour provide an indication of the level of oxidative degradation products present in the oil.

pH was measured using an Electric Instruments Ltd pH Meter model 7010. pH values measured for aqueous/supernatant samples (extracted from an oil/water 1:1 mixture) of sunflower oil used to fry potato chips and treated with the various added materials.

Viscosity was measured using a Brookfield model DV-1 digital viscometer, no. 4 rotor. Viscosity values (mPa·s) were measured for samples of sunflower oil used to fry potato chips and treated with the various added materials.

Color was measured using a Unicam UV-2 UV-VIS electronic spectrophotometer operating in the 250-700 nm range. The absorbance value of an oil sample was measured at the internationally-recognised wavelength of 490 nm, acceptable theoretical range 0.0-1.0 absorbance units.

Particle sizes of the materials used to form the disks in the various tests reported in Table 1-3 are as indicated.

TABLE 1-3

| Sunflower oil | Day | pH | Viscosity (MPa) | Colour ($A_{490}$) |
|---|---|---|---|---|
| Sunflower oil control | 0 min | 6.7 | 62 | N/A |
| | 30 min | 5.9 | 78 | |
| | 60 min | 5.6 | 88 | |
| | 90 min | 5.4 | 94 | |
| Chips Control | 1 | 6.0 | 76 | 0.04 |
| | 2 | 5.5 | 74 | 0.05 |
| | 3 | 4.8 | 72 | 0.16 |
| | 4 | 4.7 | 90 | 0.27 |
| | 5 | 4.7 | 114 | 0.63 |
| Chips Clinker (8 mm diam.) (Sample 2) | 1 | 6.0 | 68 | 0.07 |
| | 2 | 5.8 | 64 | 0.09 |
| | 3 | 5.8 | 64 | 0.14 |
| | 4 | 5.2 | 70 | 0.22 |
| | 5 | 5.2 | 94 | 0.42 |
| Chips OPC (8 mm diam.) | 1 | 6.2 | 64 | 0.02 |
| | 2 | 6.0 | 68 | 0.05 |
| | 3 | 5.9 | 72 | 0.07 |
| | 4 | 5.9 | 74 | 0.09 |
| | 5 | 5.8 | 88 | 0.19 |
| Chips hydrated OPC disk (Sample 1) | 1 | 6.0 | 64 | 0.05 |
| | 2 | 5.9 | 70 | 0.10 |
| | 3 | 5.7 | 72 | 0.14 |
| | 4 | 5.6 | 74 | 0.18 |
| | 5 | 5.6 | 98 | 0.30 |
| Chips hydrated OPC/clinker 50/50 Clinker 14.5 μm (Sample 3) | 1 | 6.0 | 64 | 0.05 |
| | 2 | 5.9 | 70 | 0.10 |
| | 3 | 5.7 | 72 | 0.14 |
| | 4 | 5.6 | 74 | 0.18 |
| | 5 | 5.6 | 98 | 0.3 |

TABLE 1-3-continued

| Sunflower oil | Day | pH | Viscosity (MPa) | Colour ($A_{490}$) |
|---|---|---|---|---|
| Chips hydrated OPC/clinker 25/75 (Sample 4) | 1 | 7.2 | 78 | 0.02 |
| | 2 | 7.2 | 78 | 0.04 |
| | 3 | 7.2 | 86 | 0.07 |
| | 4 | 6.8 | 88 | 0.12 |
| | 5 | 6.8 | 94 | 0.15 |
| Chips hydrated OPC/clinker 75/25 (Sample 5) | 1 | 7.0 | 78 | 0.02 |
| | 2 | 7.0 | 78 | 0.03 |
| | 3 | 7.0 | 82 | 0.06 |
| | 4 | 6.7 | 88 | 0.13 |
| | 5 | 6.7 | 94 | 0.36 |
| Chips hydrated OPC/clinker 50/50 Clinker 50 μm (Sample 7) | 1 | 7.0 | 78 | 0.02 |
| | 2 | 6.9 | 78 | 0.04 |
| | 3 | 6.9 | 86 | 0.07 |
| | 4 | 6.9 | 86 | 0.1 |
| | 5 | 6.8 | 94 | 0.21 |
| Chips hydrated OPC/clinker 50/50 Clinker 100 μm (Sample 8) | 1 | 7.0 | 78 | 0.03 |
| | 2 | 6.9 | 78 | 0.04 |
| | 3 | 6.9 | 82 | 0.08 |
| | 4 | 6.9 | 84 | 0.24 |
| | 5 | 6.9 | 94 | 0.58 |

It will be apparent that pH stability is better using the white Portland cement clinker indicating most effective reduction of acid, whereas change in viscosity and color is less with OPC, indicating reduction in oxidation products, so that the use of these materials in combination gives the good results. As regards particle size, 14.5 μM for both clinker and OPC was found to give the best results.

$^{1}$H NMR Spectroscopic Measurements:

Aldehyde by-products cause many of the off-flavors and off-odors in oil and fried food. They are secondary lipid oxidation products resulting from the degradation of primary oxidation products of cooking oil, e.g. hydroperoxydienes and include the following oxidation products which have been studied herein as indicators, although many other oxidation products are usually present:

(a) trans-2-alkenals (usually associated with oxidation of relatively higher monounsaturated oils), (b) trans,trans-alka-2,4-dienals, (c) 4,5-epoxy-trans-2-alkenals (main oxidation product arising from oxidation of trans,trans-alka-2,4-dienals, see Guillen et al., *Lipid Sci. Food Agric.*, 85 (2005): 2413-2420), (d) 4-hydroxy-trans-2-alkenals (likely oxidation product arising from oxidation of 4-hydroperoxy-trans-2-alkenals, see Guillen et al., supra, (e) cis,trans-alka-2,4-dienals (geometrical isomer of trans, trans-alka-2,4-dienals, usually appears at a level of 25% of that detected for trans,trans-alka-2,4-dienals) and (f) n-alkanals (usually associated with oxidation of relatively higher monounsaturated oil.

From the standpoint of toxicity in the above list the relative toxicity is believed to be in the order (c) & (d)>(a), (b) & (e)>(f).

Aldehydic concentrations based on electronic integration of detectable NMR signals of known chemical shift (frequency scale) value. Bruker Avance 600 MHz NMR spectrometer operating at a frequency of 600.13 MHz and a probe temperature of 298 K. 0.30 ml aliquots of each oil were diluted to a volume of 0.90 ml with deuterated chloroform ($C^{2}HCl_{3}$) which provided a field frequency lock, and the samples placed in 5-mm diameter NMR tubes. The $C^{2}HCl_{3}$ solvent contained $5\times10^{-3}$ mol·dm$^{-3}$ 1,3,5-trichlorobenzene (identified as a singlet resonance at δ=7.227 ppm) which served as a quantitative internal standard. Typical pulsing conditions for the 600 MHz spectrometer included 64 free induction decays (FIDs) using 32,768 data points, acquisition time 3.4079 s, sweep width 9615.38 Hz. Chemical shifts were referenced to residual chloroform (δ=7.262 ppm). Aldehydes measured in NMR spectra: (a) trans-2-alkenal, (b) trans, trans-alaka-2,4-dienal, (c) 4,5-epoxy-teans-2-alkenal, (d) 4-OH-trans2-alkenal, (e) cis,trans-alka-2,4-dienaland (f) n-alkanal. Resonances present in each spectrum were routinely assigned by a consideration of chemical shift values, coupling patterns and coupling constants. Results were as shown in Table 1-3 below. It was observed that clinker gives best adsorption of aldehydes and OPC gives the best pH, viscosity and colour results, so that a combination of the two is desirable.

TABLE 1-4

Sample results (concentration units are millimoles)

| 5 Days | trans-2-alkenal | trans, trans-alka-2,4-dienal | 4,5-epoxy-trans-2-alkenal | 4-OH-trans-2-alkenal | cis,trans-alka-2,4-dienal | n-alkanal |
|---|---|---|---|---|---|---|
| Sunflower oil Control | 23.9 | 36.9 | 4.5 | 3.5 | 6.9 | 5.0 |
| Chips Control | 27.1 | 23.9 | 5.8 | 5.8 | 3.9 | 5.2 |
| Chips Clinker (8 mm diam.) (Sample 2) | 7.7 | 14.2 | 1.3 | 0.0 | 2.6 | 6.5 |
| Chips OPC (8 mm diam.) | 17.6 | 32.0 | 3.8 | 3.8 | 6.8 | 9.9 |
| Chips hydrated OPC disk (Sample 1) | 3.4 | 9.0 | 1.7 | 1.4 | 2.9 | 2.4 |
| Chips hydrated OPC/clinker 50/50 Clinker 14.5 μm (Sample 3) | 2.7 | 8.2 | 1.3 | 1.9 | 3.1 | 1.5 |
| Chips hydrated OPC/clinker 25/75 (Sample 4) | 1.6 | 4.7 | 0.0 | 0.0 | 1.2 | 1.2 |
| Chips hydrated OPC/clinker 75/25 (Sample 5) | 2.1 | 4.8 | 0.0 | 0.0 | 1.5 | 1.3 |
| Chips hydrated OPC/clinker 50/50 Clinker 50 μm (Sample 7) | 2.1 | 4.6 | 0.0 | 0.0 | 1.8 | 1.2 |
| Chips hydrated OPC/clinker 50/50 Clinker 1000 μm (Sample 8) | 2.3 | 5.9 | 0.0 | 0.0 | 1.3 | 1.6 |

Graphical Results

Figure 16:
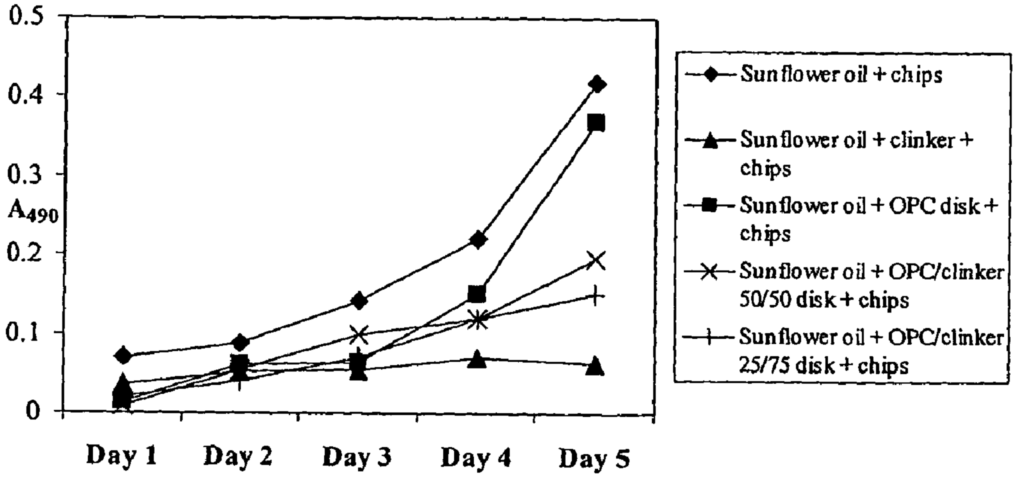
FIG. 16 is a graph of absorbance unit values (A490) as a function of time for samples of heated sunflower oil with chips and with clinker. OPC or combinations thereof.
Figure 17:
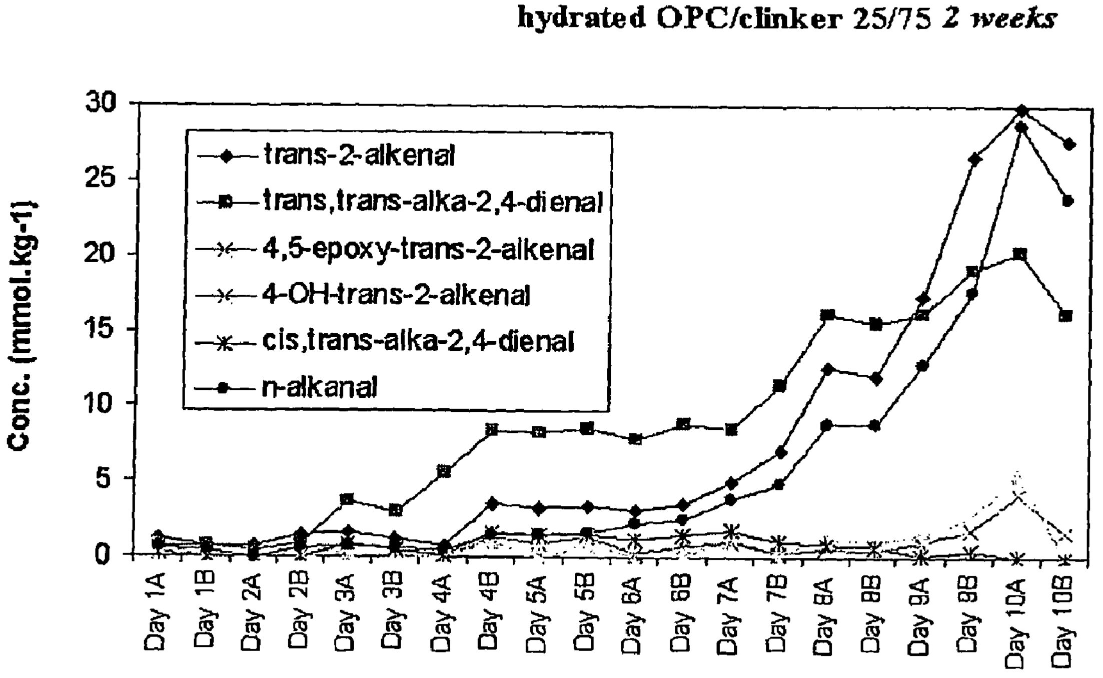
FIG. 17 shows the concentration of the indicated materials in sunflower oil in following frying tests as a function of time over a two week period.

Aldehydic concentration data obtained from the NMR experiments are shown in FIGS. 10-15, whilst the results from the color measurements are shown in FIG. 16. Frying performance using OPC clinker 25/75 over a two week period (5 frying days per week) is shown in FIG. 17. It will be noted that content of cis,trans-alka-2,4-dienal, 4-hydroxy-trans-2-alkenal and 4,5-epoxu-trans-2-alkenal remained low throughout the period of the test and that concentrations of n-alkenal, trans-2-alkenal and trans-trans-alka-2,4-dienal also remained relatively low through most of the test period.

EXAMPLE 2

Experiments on Beef Dripping

An "aldehyde cocktail" was created by adding three of the main aldehydes (trans-2-alkenals, trans,trans-alka-2,4-dienals, and n-alkanals) to beef dripping (500 g) so as to have a typical aldehydic concentration of 10 mmol/kg dripping (ca. 2 mmol/kg dripping in the case of cis,trans-alka-2,4-dienals, reflecting its typical distribution in a trans,trans-alka-2,4-dienal sample).

A filter disk (either OPC—filter 1 or OPC/clinker 50/50—filter 2, typical disk weight 35 g) was placed in the dripping, the oil then being allowed to attain an optimum cooking temperature of 180° C. through the use of an electronic hotplate. Where appropriate (see below), 90 g of potato chips was then added to the hot fat and cooked until "brown". They were then removed and replaced with fresh chips of the same weight, this being repeated so as to give a total number of fries per day of 8. A total of 2 days frying was performed. After each days frying regime, a sample of dripping was retained and $^{1}H$ NMR spectroscopic measurements were performed. For the two disk material types a total of five experiments were performed, reflecting all potential combinations of potential aldehydic retention:

(a) dripping/filter 1/no chips,
(b) dripping/filter 2/no chips
(c) dripping/chips, (d) dripping/filter 1/chips,
(e) dripping/filter 2/chips.

Figure 18:
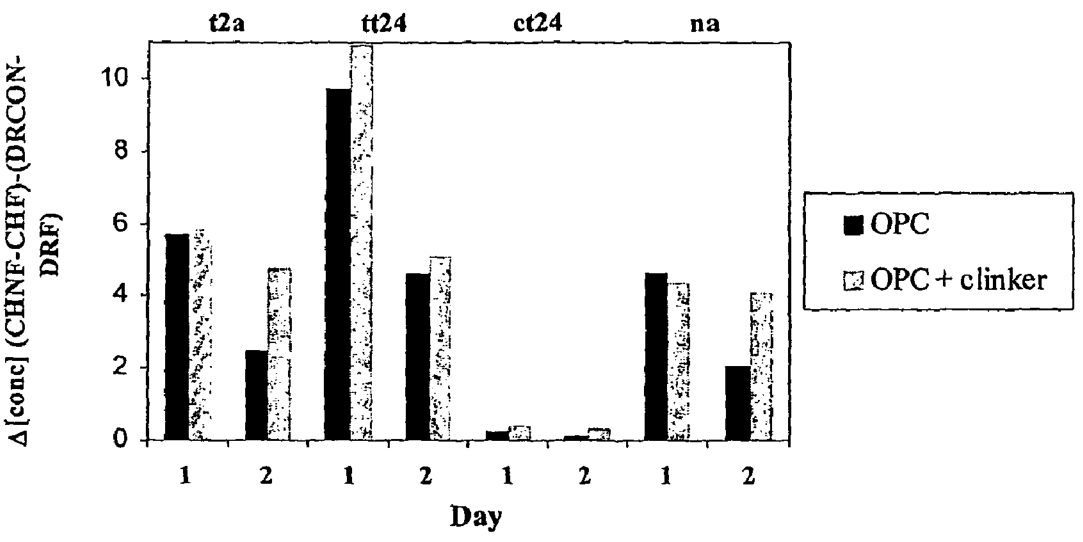
FIG. 18 is a bar-graph showing differential concentrations for the four main aldehydic species in the two day beef dripping experiments. Abbreviations: t2, tt24, ct24 and na refer to trans-2-alkenals, trans,trans-alka-2,4-dienals, cis,trans-alka-2,4-dienals and n-alkanals, respectively. Δ[conc] (CHNF-CHF)-(DRCON-DRF) refers to the various experiments (averages of fully normalized values, describing three different sets of the five main experiments), i.e. CHNF (dripping/chips/no filter), CHF dripping/chips/filter, DRCON (dripping/no chips/no filter), DRF (dripping/filter), for each day of the two day experiment, as indicated in the x-axis of the graph.

This experimental regime was repeated twice. A further control experiment involving dripping plus aldehydic cocktail with no chips or filter material was also performed. The results are shown in FIG. 18.

EXAMPLE 3

Experiments Using Sunflower Oil/Eliadic Acid

Direct heating of a small sample of the trans fatty acid elaidic acid led to the acquisition of an NMR spectrum that showed significant levels of trans-2-alkenals and n-alkanals, not unexpected for a monounsaturated fat (with the proviso that trans converts to cis upon heating).

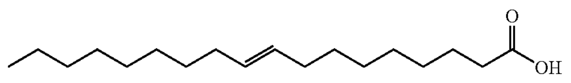

Tests were conducted on sunflower oil that had a sample of elaidic acid added, with subsequent frying of potato chips. The experimental procedure was the same as that employed in the previous examples with the exception that 0.5 g of elaidic acid was added to 400 ml of sunflower oil (giving a concentration of ca. 4 mmol/kg oil). One set of tests featured just this mixture whilst the other also included the addition of a 25/75 ratio OPC/clinker filter disk. Analysis of the sunflower oil sample spectra highlighted heightened levels of trans-2-alkenals and n-alkenals, consistent with a degree of conversion of elaidic acid to these two aldehydic species. Measured aldehydic levels are quoted in Tables 3-1 and 3-2.

TABLE 3-1

Concentrations of aldehydic components (mmol/kg oil) detected in the $^1$H NMR experiments conducted on a sunflower oil/elaidic acidmixture and used to fry potato chips (concentration units are millimoles)

| Sunflower oil/elaidic acid | trans-2-alkenal | trans, trans-alka-2,4-dienal | 4,5-epoxy-trans-2-alkenal | 4-OH-trans-2-alkenal | cis,trans-alka-2,4-dienal | n-alkanal |
|---|---|---|---|---|---|---|
| Control | 2.7 | 2.3 | 2.0 | 2.0 | 1.7 | 1.2 |
| Day 1 | 9.2 | 14.7 | 2.2 | 2.7 | 3.1 | 4.8 |
| Day 2 | 22.0 | 23.1 | 2.7 | 1.9 | 3.2 | 7.0 |
| Day 3 | 35.9 | 29.7 | 4.8 | 3.5 | 3.7 | 8.7 |
| Day 4 | 50.3 | 33.9 | 5.2 | 3.6 | 3.4 | 19.7 |
| Day 5 | 57.4 | 38.6 | 5.9 | 4.1 | 3.9 | 22.4 |

TABLE 3-2

Concentrations of aldehydic components (mmol/kg oil) detected in the $^1$H NMR experiments on a sunflower oil/elaidic acid mixture, treated with a hydrated OPC/clinker 25/75 disk and used to fry potato chips (concentration units are millimoles)

| Sunflower oil/elaidic acid/disk | trans-2-alkenal | trans, trans-alka-2,4-dienal | 4,5-epoxy-trans-2-alkenal | 4-OH-trans-2-alkenal | cis,trans-alka-2,4-dienal | n-alkanal |
|---|---|---|---|---|---|---|
| Control | 2.3 | 2.0 | 1.6 | 1.7 | 1.4 | 1.4 |
| Day 1 | 3.3 | 7.9 | 1.4 | 1.4 | 2.2 | 1.9 |
| Day 2 | 3.6 | 11.1 | 0.3 | 0.3 | 1.7 | 2.8 |
| Day 3 | 5.6 | 14.4 | 0.9 | 0.7 | 2.5 | 4.7 |

TABLE 3-2-continued

Concentrations of aldehydic components (mmol/kg oil) detected in the $^1$H NMR experiments on a sunflower oil/elaidic acid mixture, treated with a hydrated OPC/clinker 25/75 disk and used to fry potato chips (concentration units are millimoles)

| Sunflower oil/elaidic acid/disk | trans-2-alkenal | trans, trans-alka-2,4-dienal | 4,5-epoxy-trans-2-alkenal | 4-OH-trans-2-alkenal | cis,trans-alka-2,4-dienal | n-alkanal |
|---|---|---|---|---|---|---|
| Day 4 | 11.2 | 28.7 | 1.7 | 0.7 | 5.0 | 12.9 |
| Day 5 | 12.7 | 32.7 | 2.0 | 0.8 | 5.7 | 14.7 |

The control values quoted in Tables 3-1 and 3-2 represent the measured aldehydic values in a sample taken from the hot oil immediately after addition of the elaidic acid and thorough mixing of the mixture. Apart from the fact that the two sets of control values are very similar (if not essentially identical), this also implies that oxidation of both bulk oil and elaidic acid is occurring immediately, as the measured values for trans-2-alkenals and n-alkanals are of the same order as those measured for trans,trans-alka-2,4-dienals. All values had the corresponding control sunflower oil values subtracted from them, these differential values being depicted in FIGS. 10 and 11.

It can be seen that the trans-2-alkenal and n-alkanal values dominate the results for sunflower oil/elaidic acid but are largely removed when the disk filter is added to the mixture. These results therefore demonstrate, in an indirect manner, that the OPC/clinker filter devices interfere with the oxidative chemistry of trans fats so much that it can be postulated that the deleterious properties of trans fats in vivo may in part be due to the generation of aldehyde lipid oxidation products during cooking procedures.

EXAMPLE 4

Calcium Silicate Reticulated Foam

Reticulated foam samples were prepared as follows. A calcium silicate slurry was prepared incorporating hydroxypropyl methylcellulose as a binder and wetting agent to assist in the coating of polyurethane foam. Pre-cut polyurethane foam pieces of the desired pore density and the ceramic slurry mix were placed within a mixer and mixed for a predetermined time. On completion of mixing any excess slurry is then squeezed out using a mangle roller until the pores were substantially blocked. The pieces were placed onto a covered storage batt and allowed to air-dry before placing in a dehumidifier for an overnight stand. The dried pieces were then sintered following a profile allowing controlled burnout of the polyurethane to produces pieces of calcium silicate reticulated foam.

The pieces were then evaluated in the same way as in the preceding examples using sunflower oil as the test oil and frying potato chips as before.

TABLE 4-1

Aldehydes (NMR) (concentration units are millimoles):

| 5 Days | trans-2-alkenal | trans, trans-alka-2,4-dienal | 4,5-epoxy-trans-2-alkenal | 4-OH-trans-2-alkenal | cis,trans-alka-2,4-dienal | n-alkanal |
|---|---|---|---|---|---|---|
| Sunflower oil control | 23.9 | 36.9 | 4.5 | 3.5 | 6.9 | 5.0 |
| Chips Control | 27.1 | 23.9 | 5.8 | 5.8 | 3.9 | 5.2 |
| Chips calcium silicate 50% Pores/unit area (20% porosity) disk | 3.6 | 9.5 | 0.7 | 1.3 | 1.8 | 2.4 |

TABLE 4-1-continued

| Aldehydes (NMR) (concentration units are millimoles): | | | | | | |
|---|---|---|---|---|---|---|
| 5 Days | trans-2-alkenal | trans, trans-alka-2,4-dienal | 4,5-epoxy-trans-2-alkenal | 4-OH-trans-2-alkenal | cis,trans-alka-2,4-dienal | n-alkanal |
| Chips calcium silicate 35% Pores/unit area (20% porosity) disk | 3.2 | 8.7 | 0.7 | 1.1 | 1.9 | 2.1 |

(mmol units)

TABLE 4-2

| pH, Viscosity & Colour: | | | | |
|---|---|---|---|---|
| Sunflower oil | Day | Viscosities (MPa) | pH | Colour ($A_{490}$) |
| Sunflower oil control | 0 min | 62 | 6.7 | N/A |
| | 30 min | 78 | 5.9 | |
| | 60 min | 88 | 5.6 | |
| | 90 min | 94 | 5.4 | |
| Chips Control | 1 | 76 | 6.0 | 0.04 |
| | 2 | 74 | 5.5 | 0.05 |
| | 3 | 72 | 4.8 | 0.16 |
| | 4 | 90 | 4.7 | 0.27 |
| | 5 | 114 | 4.7 | 0.63 |
| Chips calcium silicate 50% Pores/unit area (20% porosity) disk | 1 | 72 | 5.9 | 0.03 |
| | 2 | 72 | 5.6 | 0.07 |
| | 3 | 78 | 5.6 | 0.07 |
| | 4 | 84 | 4.4 | 0.08 |
| | 5 | 92 | 4.4 | 0.09 |
| Chips calcium silicate 35% Pores/unit area (25% porosity) disk | 1 | 72 | 6.0 | 0.04 |
| | 2 | 72 | 5.6 | 0.05 |
| | 3 | 74 | 5.6 | 0.05 |
| | 4 | 80 | 4.5 | 0.06 |
| | 5 | 98 | 4.4 | 0.06 |

The invention claimed is:

1. A method for preserving cooking oil in a fryer during deep fat frying which comprises treating the oil while in situ in said fryer during said deep fat frying with an hydraulically set product:

consisting essentially of >50 wt % of a milled of a mixture of white OPC clinker and white OPC, and optionally, further ingredients selected from silica 1-2 wt %, titania ($TiO_2$) 1-2 wt %, calcium silicate, magnesium silicate, aluminium silicate, natural feldspars, natural sodium zeolites, natural calcium zeolites, synthetic calcium zeolites, synthetic sodium zeolites, wollastonite, calcium hydroxide, clays, pillared clays, activated clays/earths, talcs/kaolinite, amphiboles, granite porphyry, rhyolite, agalmatolite, porphyry, attapulgite, carbon black, cellulose fibre, diatomaceous earth, antioxidants, flocculants and food compatible organic acids;

the product being either a stand-alone block or briquette or being pellets or balls in a treatment cartridge, the product having the properties that calcium and magnesium substantially do not leach into the oil and that it is porous so that oil can diffuse into it and contaminants can be deposited on and within it.

2. The method of claim 1, wherein the mixture contains from 20-35 wt % OPC based on the total weight of the OPC and the OPC clinker and 65-80 wt % OPC clinker based on the total weight of the OPC and the OPC clinker.

3. The method of claim 1, wherein the mixture contains from about 25 wt % OPC based on the total weight of the OPC and the OPC clinker and about 75 wt % OPC clinker based on the total weight of the OPC and the OPC clinker.

4. The method of claim 1, wherein the oil is in a deep fat fryer having a cool spot, and the solid material is located in an upper hot region of the fryer.

5. The method of claim 1, wherein the hot oil is in a deep fat fryer having a cool spot, and the source is located in a lower cool region of the fryer.

6. The method of claim 1, wherein the product is in the form of a stand-alone block or briquette for immersion in cooking oil.

7. The method of claim 1, wherein the product consists of >75 wt % of a milled mixture of white OPC clinker and white OPC containing OPC that is 20-35 wt % of the total weight of the OPC and the OPC clinker and 65-80 wt % of OPC clinker based on the total weight of the OPC and the OPC clinker.

8. The method of claim 1, wherein the product consists of >90 wt % of a milled mixture of white OPC clinker and white OPC containing OPC that is 20-35 wt % of the total weight of the OPC and the OPC clinker and 65-80 wt % of OPC clinker based on the total weight of the OPC and the OPC clinker.

9. The method of claim 1, wherein the product consists of 100 wt % of a milled mixture of white OPC clinker and white OPC containing OPC that is about 25 wt % of the total weight of the OPC and the OPC clinker and about 75 wt % of OPC clinker based on the total weight of the OPC and the OPC clinker.

10. The method of claim 1, wherein the hydraulically set product is of white OPC clinker milled to a particle size of 10-50 μm and white OPC.

11. The method of claim 1, wherein the hydraulically set product is of white OPC clinker milled to a particle size of about 14.5 μm and white OPC.

* * * * *